United States Patent
Kopp

(10) Patent No.: US 11,905,003 B2
(45) Date of Patent: Feb. 20, 2024

(54) ROTARY-WING AIRCRAFT INDIVIDUAL ROTOR BLADE PITCH CONTROL SYSTEM

(71) Applicant: Moog Inc., East Aurora, NY (US)

(72) Inventor: John Kopp, West Seneca, NY (US)

(73) Assignee: Moog Inc., East Aurora, NY (US)

( * ) Notice: Subject to any disclaimer, the term of this patent is extended or adjusted under 35 U.S.C. 154(b) by 299 days.

(21) Appl. No.: 17/605,938

(22) PCT Filed: Apr. 24, 2020

(86) PCT No.: PCT/US2020/029842
§ 371 (c)(1),
(2) Date: Oct. 22, 2021

(87) PCT Pub. No.: WO2020/219900
PCT Pub. Date: Oct. 29, 2020

(65) Prior Publication Data
US 2022/0227487 A1 Jul. 21, 2022

Related U.S. Application Data

(60) Provisional application No. 62/838,625, filed on Apr. 25, 2019.

(51) Int. Cl.
*B64C 27/72* (2006.01)
*B64C 27/68* (2006.01)
*B64C 27/605* (2006.01)

(52) U.S. Cl.
CPC ............ *B64C 27/68* (2013.01); *B64C 27/605* (2013.01); *B64C 2027/7255* (2013.01)

(58) Field of Classification Search
CPC .. B64C 2027/725; B64C 27/68; B64C 27/605
See application file for complete search history.

(56) References Cited

U.S. PATENT DOCUMENTS 3,572,616 A    3/1971    Ulisnik
4,519,743 A * 5/1985    Ham ...................... B64C 27/72
                                               416/114

(Continued)

FOREIGN PATENT DOCUMENTS

| EP | 1153829 A2 * | 11/2001 | ........... B64C 27/605 |
| EP | 1153829 A2 | 11/2001 | |
| WO | 90/08063 A2 | 7/1990 | |

OTHER PUBLICATIONS

European Patent Office (ISA/EP), International Search Report and Written Opinion in PCT/US2020/029842, dated Aug. 26, 2020, 13 pages.

(Continued)

*Primary Examiner* — Tye William Abell
(74) *Attorney, Agent, or Firm* — Harter Secrest & Emery LLP

(57) ABSTRACT

A rotor blade pitch control system (15) comprising a rotor blade (19a, 19b, 19c, 19d) rotatable about both a central axis (20) and a pitch axis (24a, 24b, 24c, 24d), a pitch drive rotor (32a, 32b, 32c, 32d) rotatable about the central axis independently of rotation of the rotor blade about the central axis, a pitch follower (40a, 40b, 40c, 40d) rotatable relative to the pitch drive rotor, the pitch drive rotor and the pitch follower having an eccentric axis (33a, 33b, 33c, 33d), a linkage (50a, 50b, 50c, 50d) between the pitch follower and the rotor blade configured such that the pitch follower rotates with rotation of the rotor blade about the central axis, the pitch drive rotor, the pitch follower and the linkage configured such that the pitch drive rotor may be driven to control an angular displacement of the pitch drive rotor relative to the pitch follower about the central axis and thereby control the pitch of the rotor blade about the pitch axis.

27 Claims, 19 Drawing Sheets

(56) References Cited

U.S. PATENT DOCUMENTS

| | | | |
|---|---|---|---|
| 4,669,958 A | 6/1987 | Peyran et al. | |
| 4,930,988 A * | 6/1990 | Griffith | B64C 27/72 |
| | | | 416/114 |
| 5,628,620 A * | 5/1997 | Arlton | A63H 27/12 |
| | | | 446/40 |
| 6,099,254 A | 8/2000 | Blaas et al. | |
| 7,674,091 B2 | 3/2010 | Zierten | |
| 8,235,324 B1 * | 8/2012 | Birch | B64C 27/68 |
| | | | 244/17.25 |
| 2008/0111399 A1 * | 5/2008 | Zierten | B64C 27/605 |
| | | | 296/210 |
| 2009/0269199 A1 * | 10/2009 | Rudley | B64C 27/72 |
| | | | 416/155 |
| 2014/0314130 A1 | 10/2014 | Sane et al. | |
| 2017/0210480 A1 | 7/2017 | Lauder et al. | |

OTHER PUBLICATIONS

Haber et al. (2002) "Development, Manufacturing, and Component Testing of an Individual Blade Control System for a UH-60 Helicopter Rotor," American Helicopter Society Aerodynamics, Acoustics, and Test and Evaluation Technical Specialists Meeting, San Francisco, CA: 1-10.

* cited by examiner

US 11,905,003 B2

ROTARY-WING AIRCRAFT INDIVIDUAL ROTOR BLADE PITCH CONTROL SYSTEM

TECHNICAL FIELD

The present disclosure relates generally to the field of rotary-wing aircraft actuation systems, and more particularly to a rotary-wing aircraft rotor blade pitch control system.

BACKGROUND ART

Rotary-wing aircraft, such as helicopters, are typically propelled by a main rotor having a hub rotatably supported on a rotor mast and supporting a plurality of rotor blades extending radially outward from the hub. To control vertical lift or altitude, the pitch of the rotating blades is typically adjusted collectively through a rotating swash plate that is coupled to the blades by respective linkages. This adjustment of the pitch of the blades changes a blade's angle of attack relative to the stream of air moving past it. The higher the angle of attack, the more highly loaded the blade becomes in creating more lift.

To control horizontal movement, the pitch of each blade is varied by a given amount once per rotor revolution. Conventionally, this tilting of the rotor is affected by tilting the swash plate, which results in the pitch of each of the blades changing twice per revolution of the hub. For example, to move the aircraft directly forward, the pitch of each blade is increased each time that blade passes over the tail of the aircraft, such that the lift developed by that blade is then temporarily greater than that of the other blades, and thereby results in a forward thrust component being applied to the aircraft by the rotor.

The pitch of each blade in a conventional rotor is controlled by a control rod, and the positions of all such rods are typically controlled by a single swashplate. The control rods are mounted circumferentially around the swashplate so that axial movement of the swashplate causes collective changes in pitch. Longitudinal and lateral tilting of the swashplate results in cyclic pitch control.

Individual blade control systems have been used to enable the pitch of each blade to be varied independently of the others. Typical approaches to individual blade control utilize either electrical motor actuators and slip rings, or hydraulic actuators, hydraulic swivels and electrical slip ring systems.

U.S. Pat. No. 4,519,743, entitled "Helicopter Individual Blade Control System," is directed to a system in which the pitch of the blades of a helicopter rotor assembly are controlled by individual blade control subsystems that respond to output signals from accelerometers mounted on the blades.

U.S. Pat. No. 4,930,988, entitled "Individual Blade Control System for Helicopters," is directed to a control system for providing individual blade control inputs to a four-bladed helicopter rotor. Motion is transmitted to the rotor blades through a conventional swashplate which drives four blades of the rotor and a translatable differential sleeve and summing linkage which drives only two blades.

U.S. Pat. No. 7,674,091, entitled "Rotor Blade Pitch Control," is directed to a mechanical independent blade control mechanism for controlling the pitch of each of the blades of a rotor blade system independently of the other blades. The system includes a plurality of actuators disposed in the fuselage below the hub of the rotor, each being operable to selectively control the pitch of an associated one of the blades independently of the other blades, and a plurality of mechanical linkages disposed within the annulus of the rotor mast, each coupled between a blade and an actuator and operable to transmit a force output by the actuator to a pitch horn fixed to an inner end of the associated blade.

BRIEF SUMMARY

With parenthetical reference to the corresponding parts, portions or surfaces of the disclosed embodiment, merely for purposes of illustration and not by way of limitation, an rotor blade pitch control system (15) for a rotary-wing aircraft (16) having a plurality of rotor blades mounted to a main rotor and driven about a central axis of rotation at an operational speed and in a rotational direction relative to a non-rotating body of the aircraft is provided comprising: a first rotor blade (19a) connected to a main rotor (17) and operatively configured to be driven about a central axis of rotation (20) relative to a non-rotating body (21) of the aircraft; the first rotor blade (19a) rotatable about a first pitch axis (24a); a first blade pitch control motor (30a) having a first stator (31a), a first pitch drive rotor (32a) and a first pitch follower (40a); a first linkage (50a) extending between the first pitch follower (40a) and the first rotor blade (19a); a first rotor blade coupling (58a) between the first linkage (50a) and the first rotor blade (19a); the first rotor blade coupling (58a) having a first rotor blade coupling center (59a); a first pitch follower coupling (51a) between the first linkage (50a) and the first pitch follower (40a); the first pitch follower coupling (51a) having a first pitch follower coupling center (52a); a first hinge coupling (53a) between the first linkage (50a) and the main rotor (17); the first hinge coupling (53a) having a first hinge axis (54a); the first pitch drive rotor (32a) having a first cam surface (36a) orientated about a first driven axis (35a) that is eccentric to the central axis of rotation (20); the first linkage (50a) extending between the main rotor (17) and the first pitch follower (40a) such that the first pitch follower coupling center (52a) rotates about the central axis of rotation (20) with rotation of the first hinge coupling (53a) about the central axis of rotation (20); the first pitch drive rotor (32a) operatively configured to be driven about the central axis of rotation (20) independently of the main rotor (17) to selectively rotate the first driven axis (35a) about the central axis of rotation (20); the first driven axis (35a) and the first pitch follower coupling center (52a) having a selectively variable first displacement angle (80a) defined by an inclusive angle between a line (81a) extending radially between the central axis of rotation (20) and the first driven axis (35a) and a line (82a) extending radially between the central axis of rotation (20) and the first pitch follower coupling center (52a); wherein the first pitch drive rotor (32a) may be rotated about the central axis of rotation (20) relative to the main rotor (17) to control a pitch (71a) of the first rotor blade (19a) about the first pitch axis (24a).

The first displacement angle (80a) may range from a minimum displacement angle (0°) to a maximum displacement angle (180°), the pitch may range from a first pitch angle limit (74a) to a second pitch angle limit (75a), and when the first displacement angle is the maximum (180°), the pitch may be the first pitch angle limit (74a), and when the first displacement angle is the minimum (00), the pitch may be the second pitch angle limit (75a). The pitch may comprise a neutral pitch angle (76a), and when the first displacement angle is about half of the maximum (90°), the pitch may be the neutral pitch angle (76a).

The first linkage may comprise a first transfer link (60a) and a first pitch link (64a); the main rotor (17) may comprise a hinge hub (25); and the first rotor blade (19a) may comprise a pitch horn (65a). The first transfer link (60a) may be coupled to the first pitch follower (40a) by the first pitch follower coupling (51a); the first transfer link (60a) may be coupled to the hinge hub (25) of the main rotor (17) by the first hinge coupling (53a); the first pitch link (60a) may be coupled to the first pitch horn (65a) of the first rotor blade (19a) by the first rotor blade coupling (58a); and the first transfer link (60a) may be coupled to the first pitch link (64a) by a first intermediate coupling (55a) having a first intermediate coupling center (56a). The first rotor blade coupling center (59a) of the first rotor blade coupling (58a) may be offset a pitch horn distance (66a) from the first pitch axis (24a). The first pitch follower coupling may comprise a ball joint or a universal coupling.

The first pitch follower (40a) may be rotatable relative to the first pitch drive rotor (32a) about the first driven axis (35a). The first pitch drive rotor (32a) may comprise a first annular drive bore (34a) having a first drive axis coincident with the central axis of rotation (20); the first cam surface of the first pitch drive rotor (32a) may comprise a first outer annular rim (36a) having a first rim axis coincident with the first driven axis (35a); and the first pitch follower (40a) may comprise a first annular following bore (42a) having a first following bore axis coincident with the first rim axis (35a). The rotor blade pitch control system may comprise an annular bearing (43a) between the first outer annular rim (36a) and the first annular following bore (42a). The first pitch drive rotor (32a) may radially constrain the first pitch follower (40a) relative to the central axis of rotation (20).

The rotor blade pitch control system may comprise a controller (90) that receives input signals and outputs command signals to the first blade pitch control motor (30a) to control a speed of rotation of the first pitch drive rotor (32a) about the central axis of rotation (20) and the first displacement angle (80a). The controller may vary the first displacement angle (80a) to vary the pitch (71a) of the first rotor blade (19a) about the first pitch axis (24a). The first displacement angle (80a) may be variable from 0 degrees to 180 degrees. The controller (90) may maintain a constant first displacement angle (80a) to maintain a desired constant pitch (71a) of the first rotor blade (19a) about the first pitch axis (24a). The controller may selectively control the first blade pitch control motor (30a) such that the first driven axis (35a) rotates about the central axis of rotation (20) at a first rotational speed and the main rotor (17) rotates about the central axis of rotation at a second rotational speed, whereby the controller (90) controls a speed differential between the first speed of rotation of the first driven axis (35a) about the central axis of rotation (20) and the second speed of rotation of the main rotor (17) about the central axis of rotation (20). The controller may vary the first displacement angle (80a) by varying the speed differential from substantially 1 to 1. The controller (90) may vary the pitch (71a) of the first rotor blade (19a) about the first pitch axis (24a) by varying the speed differential such that the first rotational speed that the first driven axis (35a) rotates about the central axis of rotation (20) is different from the second rotational speed that the main rotor (17) rotates about the central axis of rotation (20).

The rotor blade pitch control system may comprise a unit frame (29) mounted to a non-rotating body (26) of the aircraft; the first stator (31a) of the first blade pitch control motor (30a) may be mounted to the unit frame (29); and the first pitch drive rotor (32a) may have an annular stator-facing portion (34a) and a plurality of magnets (39a) supported by the annular stator-facing portion (34a).

The rotor blade pitch control system may comprise: a second rotor blade (19b) connected to the main rotor (17) and operatively configured to be driven about the central axis of rotation (20) relative to the non-rotating body (21) of the aircraft; the second rotor blade (19b) rotatable about a second pitch axis (24b); a second blade pitch control motor (30b) having a second stator (31b), a second pitch drive rotor (32b) and a second pitch follower (40b); a second linkage (50b) extending between the second pitch follower (40b) and the second rotor blade (19b); a second rotor blade coupling (58b) between the second linkage (50b) and the second rotor blade (19b); the second rotor blade coupling (58b) having a second rotor blade coupling center (59b); a second pitch follower coupling (51b) between the second linkage (50b) and the second pitch follower (40b); the second pitch follower coupling (51b) having a second pitch follower coupling center (52b); a second hinge coupling (53b) between the second linkage (50b) and the main rotor (17); the second hinge coupling (53b) having a second hinge axis (54b); the second pitch drive rotor (32b) having a second cam surface (36b) orientated about a second driven axis (35b) that is eccentric to the central axis of rotation (20); the second linkage (50b) extending between the main rotor (17) and the second pitch follower (40b) such that the second pitch follower coupling center (52b) rotates about the central axis of rotation (20) with rotation of the second hinge coupling (53b) about the central axis of rotation (20); the second pitch drive rotor (32b) operatively configured to be driven about the central axis of rotation (20) independently of the main rotor (17) and independently of the first pitch drive rotor (32a) to selectively rotate the second driven axis (35b) about the central axis of rotation (20); and the second driven axis (35b) and the second pitch follower coupling center (52b) having a selectively variable second displacement angle (80b) defined by an inclusive angle between a line (81b) extending radially between the central axis of rotation (20) and the second driven axis (35b) and a line (82b) extending radially between the central axis of rotation (20) and the second pitch follower coupling center (52b); wherein the second pitch drive rotor (32b) may be rotated about the central axis of rotation (20) relative to the main rotor (17) to control a pitch (71b) of the second rotor blade (19b) about the second pitch axis (24b) independently of the control of the pitch of the first rotor blade (19a) about the first pitch axis (24a). The rotor blade pitch control system may comprise a controller (90) that receives input signals and outputs command signals to the second blade pitch control motor (30b) to control a speed of rotation of the second pitch drive rotor (32b) about the central axis of rotation (20) and the second displacement angle (80b).

In another aspect, a rotor blade pitch control system is provided comprising: a first rotor blade (19a) operatively configured to be driven about a central axis of rotation (20); the first rotor blade (19a) rotatable about a first pitch axis (24a); a first pitch drive rotor (32a) operatively configured to be driven about the central axis of rotation (20) independently of rotation of the first rotor blade (19a) about the central axis of rotation (20); a first pitch follower (40a) rotatable relative to the first pitch drive rotor (32a); the first pitch follower (40a) and the first rotor blade (19a) coupled (50a) such that the first pitch follower (40a) rotates with rotation of the first rotor blade (19a) about the central axis of rotation (20); the first pitch drive rotor (32a), the first pitch follower (40a) and the first rotor blade (19a) coupled (50a) such that the first pitch drive rotor (32a) is operatively configured to be driven to control an angular displacement (80a) of the first pitch drive rotor (32a) relative to the first pitch follower (40a) about the central axis of rotation (20) and thereby control a pitch (71a) of the first rotor blade (19a) about the first pitch axis (24a).

The rotor blade pitch control system may comprise: a second rotor blade (19b) operatively configured to be driven about the central axis of rotation (20); the second rotor blade (19b) rotatable about a second pitch axis (24b); a second pitch drive rotor (32b) operatively configured to be driven about the central axis of rotation (20) independently of rotation of the second rotor blade (19b) about the central axis of rotation (20) and independently of the first pitch drive rotor (32a) about the central axis of rotation (20); a second pitch follower (40b) rotatable relative to the second pitch drive rotor (32b); the second pitch follower (40b) and the second rotor blade (19b) coupled (50b) such that the second pitch follower (40b) rotates with rotation of the second rotor blade (19b) about the central axis of rotation (20); the second pitch drive rotor (32b), the second pitch follower (40b) and the second rotor blade (19b) coupled (50b) such that the second pitch drive rotor (32b) is operatively configured to be driven to control an angular displacement (80b) of the second pitch drive rotor (32b) relative to the second pitch follower (40b) about the central axis of rotation (20) and thereby control a pitch (71b) of the second rotor blade (19b) about the second pitch axis (24b) independently of the control of the pitch (71a) of the first rotor blade (19a) about the first pitch axis (24a).

The rotor blade pitch control system may comprise a first linkage (50a) between the first pitch follower (40a) and the first rotor blade (19a). The rotor blade pitch control system may comprise: a first pitch follower coupling (51a) between the first linkage (50a) and the first pitch follower (40a); the first pitch follower coupling (51a) having a first pitch follower coupling center (52a); the first pitch drive rotor (32a) having a first cam surface (36a) orientated about a first driven axis (35a) that is eccentric to the central axis of rotation (20); and wherein the angular displacement (80a) of the first pitch drive rotor (32a) relative to the first pitch follower (40a) comprises a selectively variable first displacement angle defined by an inclusive angle between a line (81a) extending radially between the central axis of rotation (20) and the first driven axis (35a) and a line (82a) extending radially between the central axis of rotation (20) and the first pitch follower coupling center (52a). The rotor blade pitch control system may comprise: a main rotor (17) connected to the first rotor blade (19a) and operatively configured to be driven about the central axis of rotation (20); a first hinge coupling (53a) between the first linkage (50a) and the main rotor (17); the first hinge coupling (53a) having a first hinge axis (54a); and the first linkage (50a) extending between the main rotor (17) and the first pitch follower (40a) such that the first pitch follower coupling center (52a) rotates about the central axis of rotation (20) with rotation of the first hinge coupling (53a) about the central axis of rotation (20).

The rotor blade pitch control system may comprise a first blade pitch control motor (30a) operatively configured to drive the first pitch drive rotor (32a) about the central axis of rotation (20) and a controller (90) that receives input signals and outputs command signals to the first blade pitch control motor (30a) to control a speed of rotation of the first pitch drive rotor (32a) about the central axis of rotation (20) and the angular displacement (80a) of the first pitch drive rotor (32a) relative to the first pitch follower (40a) about the central axis of rotation (20).

DETAILED DESCRIPTION OF THE EMBODIMENTS

Figure 1:
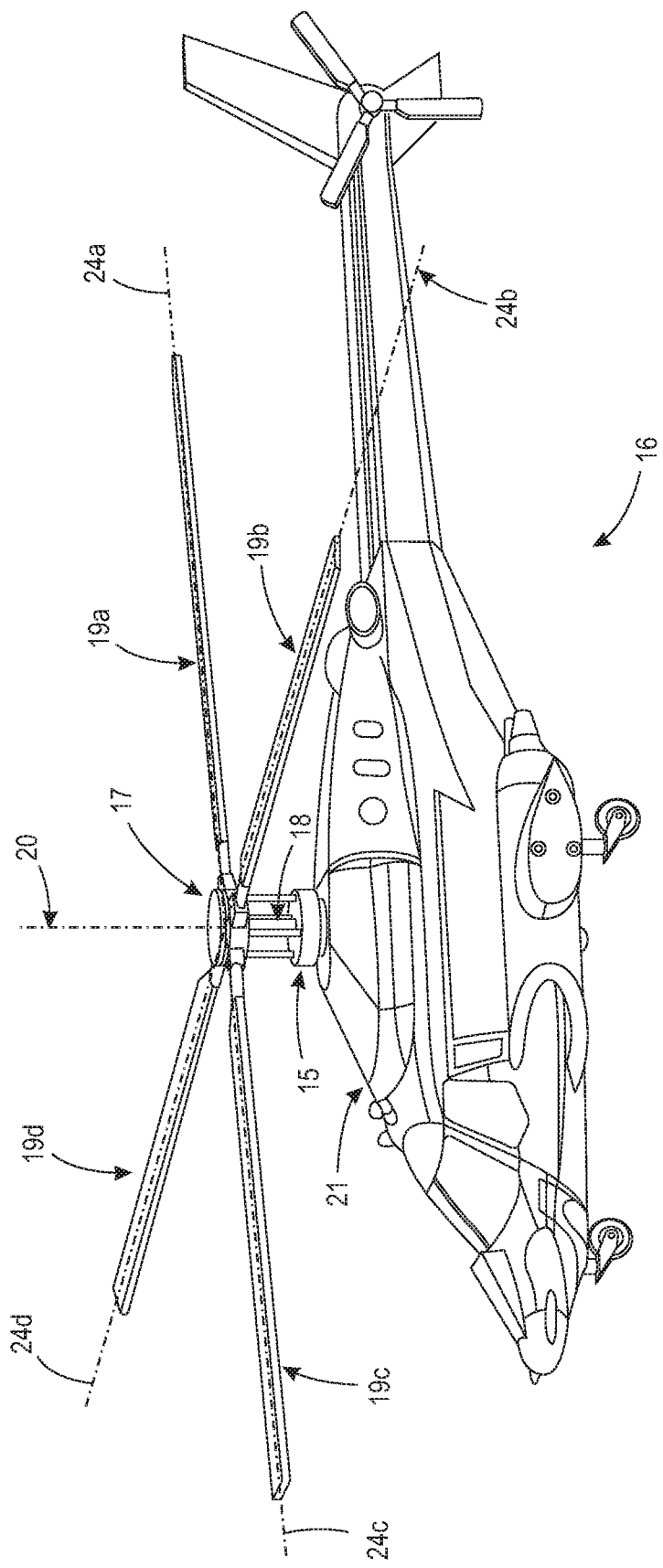
FIG. 1 is a representative perspective view of a first embodiment of the improved individual rotor blade pitch control system on a main rotor assembly of a helicopter.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., crosshatching, arrangement of parts, proportion, degree, etc.) together with the specification, and are to be considered a portion of the entire written description. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

FIG. 1 is a schematic illustration of helicopter 16 having airframe 21 and main rotor 17 that is driven about center axis of rotation 20. Main rotor 17 includes rotor blades 19a, 19b, 19c and 19d rotationally mounted to main rotor blade hub 22 on main rotor 17 via rotor blade grips 23a, 23b, 23c and 23d that allow the rotor blades to be rotated about their pitch axes 24a, 24b, 24c and 24d, respectively, so that the pitch of the rotor blades may be selectively varied. Rotor blades 19a, 19b, 19c and 19d have pitch horns 65a, 65b, 65c and 65d, respectively, to which a torque may be applied to control the respective pitch angle 71a, 71b, 71c and 71d of the rotor blade about its pitch axis 24a, 24b, 24c and 24d, respectively.

Rotor blade hub 22 is driven about central axis of rotation 20 by main rotor shaft 18, which is driven through a main rotor gear box by one or more aircraft engines. Main rotor shaft 18 and blade hub 22 rotate in a rotational direction and at an operational rotational frequency about center axis of rotation 20. Although a helicopter is shown and described in this embodiment, rotor blade pitch control system 15 may be used with other types or configurations of rotary-wing aircraft or rotor-craft or in other pitch control applications.

As shown in FIGS. 1-4, rotor blade pitch control system 15 is mounted between fuselage 21 and main rotor 17 and is generally orientated concentrically with main rotor 17. FIG. 1 provides a frame of reference comprising longitudinal axis x-x aligned with the longitudinal axis of helicopter 16, transverse axis y-y perpendicular to axis x-x, and vertical axis z-z concentric with central axis of rotation 20 of main rotor 17.

Figure 2:
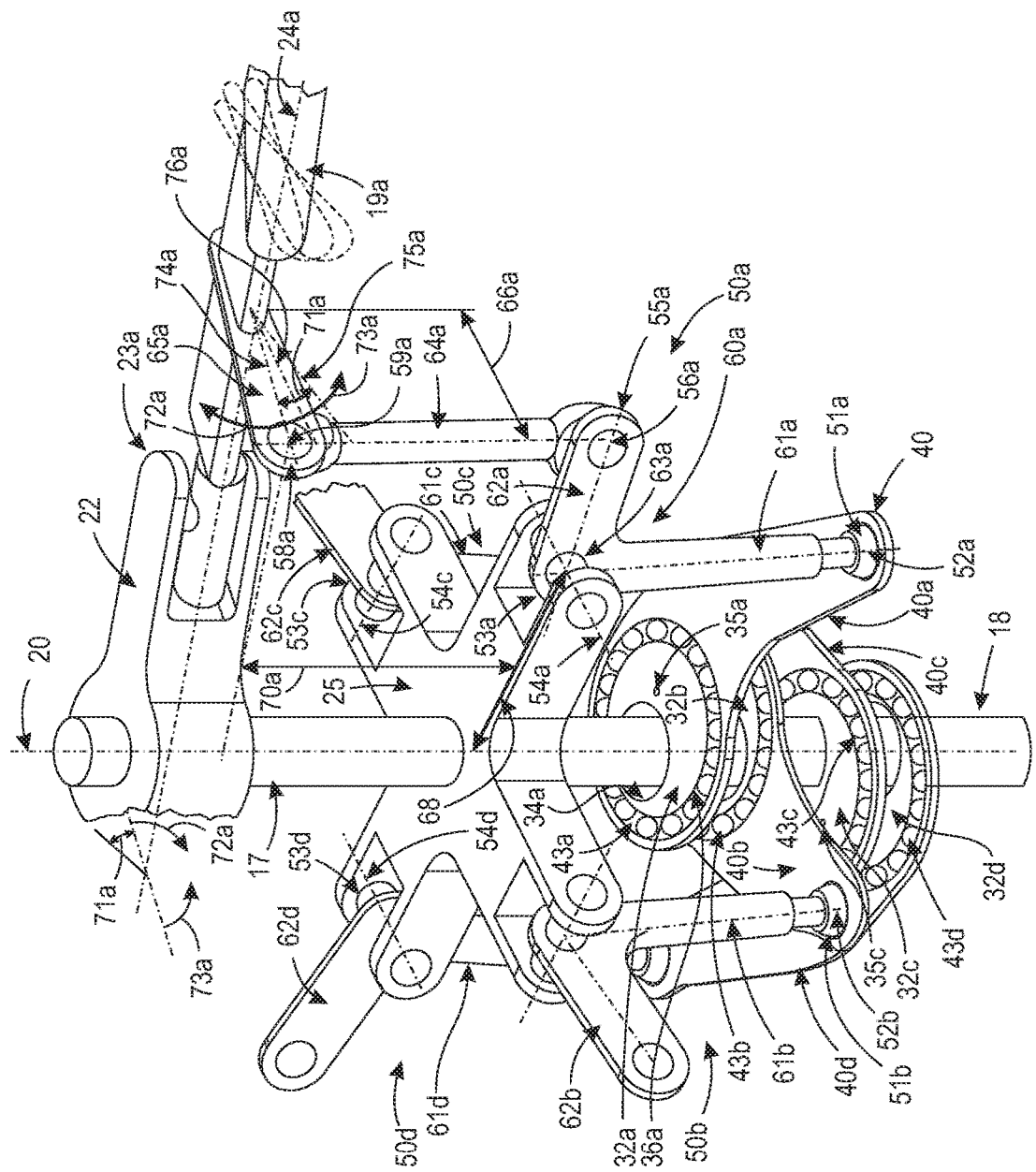
FIG. 2 is an enlarged representative perspective view of the individual rotor blade pitch control system shown in FIG. 1.
Figure 3:
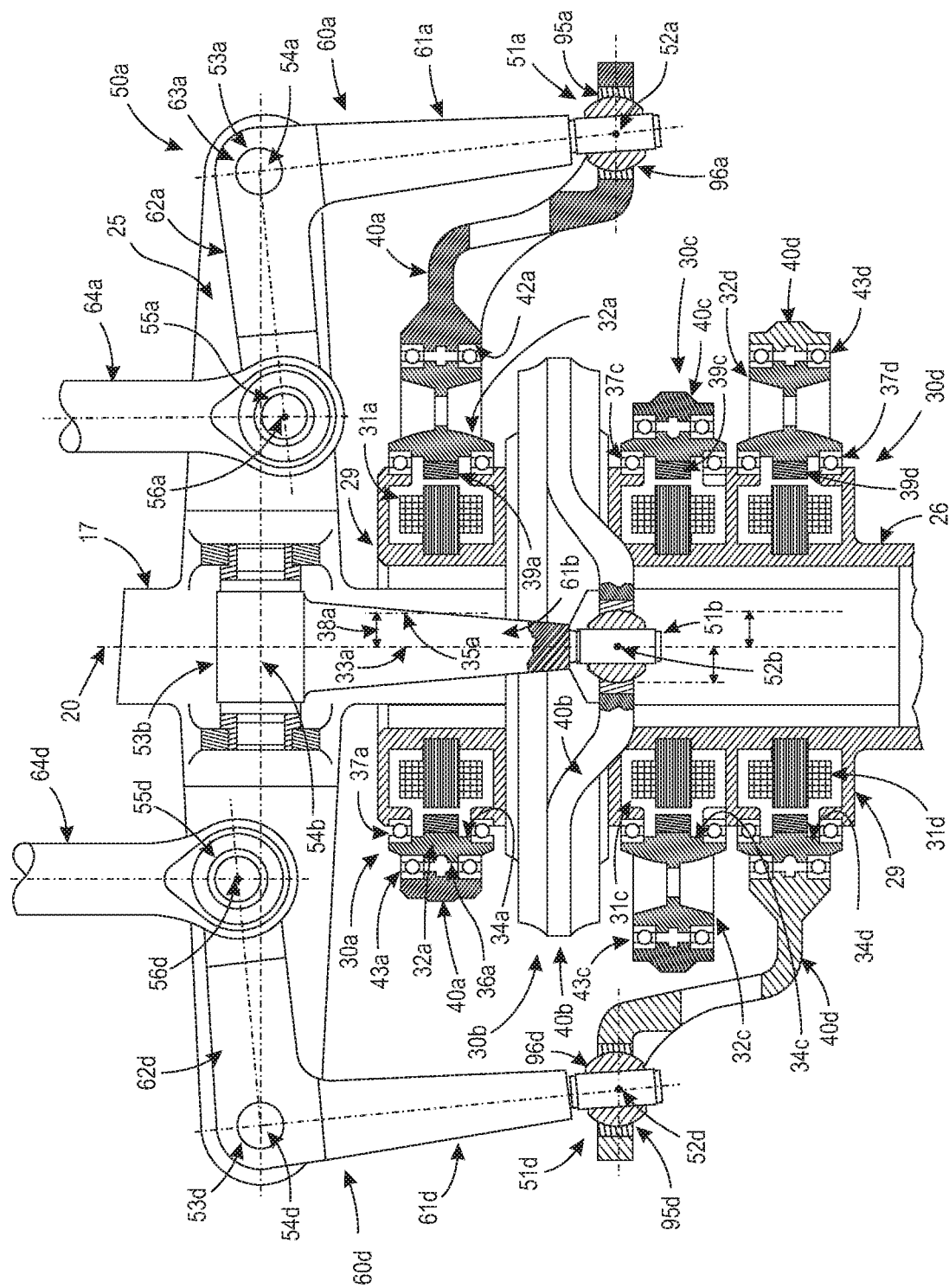
FIG. 3 is a vertical cross-sectional view of the individual rotor blade pitch control system shown in FIG. 1.
Figure 4:
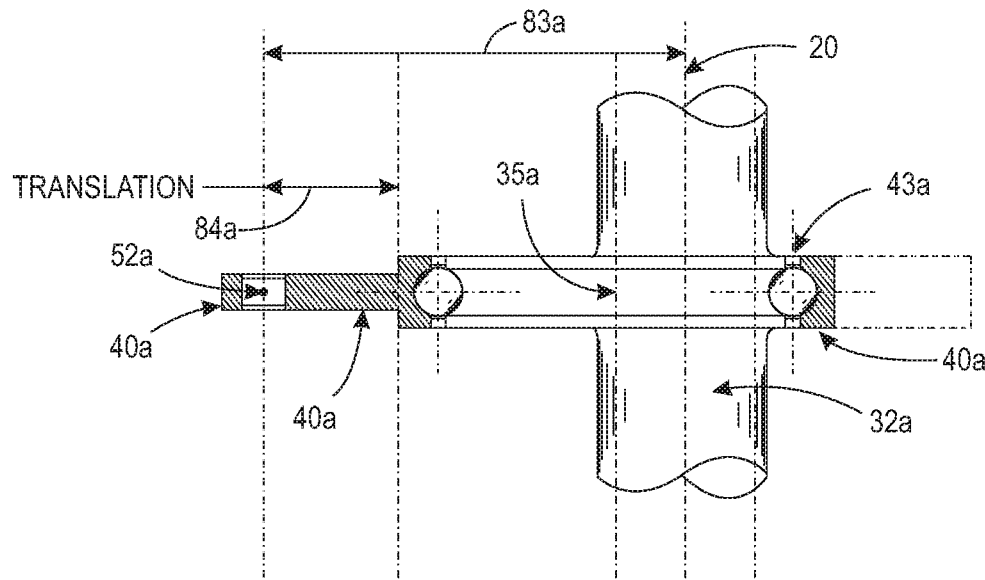
FIG. 4 is a partial vertical cross-sectional representative view of a pitch rotor and pitch follower assembly of the individual blade pitch control system shown in FIG. 1.

As shown in FIGS. 2-4, rotor blade pitch control system 15 generally includes first pitch control motor 30a mounted to static mast 26 of airframe 21 of helicopter 16, first linkage 50a connecting first pitch control motor 30a and first rotor blade 19a, second pitch control motor 30b mounted to static mast 26 of airframe 21 of helicopter 16, second linkage 50b connecting second pitch control motor 30b and second rotor blade 19b, third pitch control motor 30c mounted to static mast 26 of airframe 21 of helicopter 16, third linkage 50c connecting third pitch control motor 30c and third rotor blade 19c, fourth pitch control motor 30d mounted to static mast 26 of airframe 21 of helicopter 16, and fourth linkage 50d connecting fourth pitch control motor 30d and fourth rotor blade 19d.

Rotor blade pitch control system 15 includes cylindrical support frame 29 orientated coaxially with main rotor 17 about central axis 20. Support frame 29 is fixed to static mast 26 of helicopter 16 and does not rotate relative to fuselage 21 of helicopter 16. Frame 29 supports each of pitch motors 30a, 30b, 30c and 30d.

Motor 30a comprises stator 31a, fixed to frame 29, and rotor 32a that is driven to rotate about drive axis 33a relative to stator 31a. In this embodiment, drive axis 33a is coaxial with central axis 20. Upper and lower bearings 37a act between rotor 32a and frame 29 such that rotor 32a is driven by motor 30a to rotate about axis 33a relative to frame 29. In this embodiment, motor 30a is a rotary brushless permanent magnet electric motor with rotor 32a having permanent magnets 39a spaced around its inwardly-facing annular stator-facing surface 34a and stator 31a having coils energized to drive rotor 32a about axis 33a in either rotational direction.

Motor 30b comprises stator 31b, fixed to frame 29, and rotor 32b that is driven to rotate about drive axis 33b relative to stator 31b. In this embodiment, drive axis 33b is coaxial with central axis 20. Upper and lower bearings 37b act between rotor 32b and frame 29 such that rotor 32b is driven by motor 30b to rotate about axis 33b relative to frame 29. In this embodiment, motor 30b is a rotary brushless permanent magnet electric motor with rotor 32b having permanent magnets 39b spaced around its inwardly-facing annular stator-facing surface 34b and stator 31b having coils energized to drive rotor 32b about axis 33b in either rotational direction.

Motor 30c comprises stator 31c, fixed to frame 29, and rotor 32c that is driven to rotate about drive axis 33c relative to stator 31c. In this embodiment, drive axis 33c is coaxial with central axis 20. Upper and lower bearings 37c act between rotor 32c and frame 29 such that rotor 32c is driven by motor 30c to rotate about axis 33c relative to frame 29. In this embodiment, motor 30c is a rotary brushless permanent magnet electric motor with rotor 32c having permanent magnets 39c spaced around its inwardly-facing annular stator-facing surface 34c and stator 31c having coils energized to drive rotor 32c about axis 33c in either rotational direction.

Motor 30d comprises stator 31d, fixed to frame 29, and rotor 32d that is driven to rotate about drive axis 33d relative to stator 31d. In this embodiment, drive axis 33d is coaxial with central axis 20. Upper and lower bearings 37d act between rotor 32d and frame 29 such that rotor 32d is driven by motor 30d to rotate about axis 33d relative to frame 29. In this embodiment, motor 30d is a rotary brushless permanent magnet electric motor with rotor 32d having permanent magnets 39d spaced around its inwardly-facing annular stator-facing surface 34d and stator 31d having coils energized to drive rotor 32d about axis 33d in either rotational direction.

In this embodiment, motor axis 33a, motor axis 33b, motor axis 33c, motor axis 33d and central axis 20 are coaxial and rotors 32a, 32b, 32c and 32d are directly driven by motors 30a, 30b, 30c and 30d, respectively. However, alternatively such rotors could be indirectly driven through gear trains, belts or other rotational couplings, and could be non-concentric to each other and to central axis 20.

Drive rotor 32a of first motor 30a is rotationally coupled via follower 40a to linkage 50a at spherical bearing 51a, drive rotor 32b of second motor 30b is rotationally coupled via follower 40b to linkage 50b at spherical bearing 51b, drive rotor 32c of third motor 30c is rotationally coupled via follower 40c to linkage 50c at spherical bearing 51c, and drive rotor 32d of fourth motor 30d is rotationally coupled via follower 40d to linkage 50d at spherical bearing 51d.

Inner directly driven rotor 32a is rotationally coupled to outer follower 40a such that follower 40a and inner rotor 32a are rotatable relative to each other. As further described below, follower 40a rotates via linkage 50a with main rotor 17, which in turn is driven by the engine of helicopter 16 about central axis 20. As further described below, drive rotor 32a has driven axis 35a that is selectively driven to rotate about central axis 20 by motor 30a independently of main rotor 17.

Rotor 32a includes an inner bore defined by inner annular surface 34a orientated about drive axis 33a that is coincident with central axis 20, and outer annular rim 36a orientated about driven axis 35a. Driven axis 35a is parallel to and not coaxial with drive axis 33a, such that driven axis 35a is radially offset eccentric radial distance 38a from central axis 20 and drive axis 33a. Follower 40a has an inner annular bore defined by inner annular surface 42a, which is orientated about driven axis 35a and coaxially with outer annular rim 36a of rotor 32a. As shown, spherical coupling 51a couples follower 40a to one end of linkage 50a at coupling center 52a. Coupling center 52a and follower 40a will rotate about driven axis 35a with rotation of main rotor 17 about central axis 20. Annular bearing 43a acts between rotor 32a and follower 40a such that follower 40a may rotate, via linkage 50a, with rotation of main rotor 17 relative to drive rotor 32a. As explained further below, the relative angular positions of drive rotor 32a and follower 40a about central axis 20 dictate the pitch of rotor blade 19a about pitch axis 24a.

As shown, rotor 32a is rotationally supported by frame 29. Upper and lower bearing pairs 37a act between the outer cylindrical bearing surfaces of frame 29 and the opposed inner cylindrical bearing surfaces 34a of rotor 32a. Rotor 32a is thereby configured to rotate about axis 20 on upper and lower annular bearing pairs 37a. Thus, rotor 32a is mounted on frame 29 by rolling bearings 37a such that drive rotor 32a is rotatable relative to frame 29 and fuselage 21.

Follower 40a is rotationally supported between rotor 32a and linkage 50a. Upper and lower bearing pairs 43a act between outer cylindrical bearing surface 36a of rotor 32a and opposed inner cylindrical bearing surface 42a of follower 40a. Follower 40a is configured to rotate about driven axis 35a on upper and lower bearing pairs 43a. Thus, follower 40a is mounted on rotor 32a by rolling bearings 43a such that follower 40a is rotatable about central axis 20 relative to rotor 32a.

As shown, the outer end of follower 40a is rotationally supported, via spherical bearing 51a having coupling center 52a, by the follower end of linkage 50a. Linkage 50a is rotationally supported, via hinge joint 53a having hinge axis 54a, by hinge hub 25 of main rotor 17. The pitch horn end of linkage 50a is rotationally supported, via spherical bearing 58a having coupling center 59a, by pitch horn 65a of rotor blade 19a. In this embodiment, linkage 50a comprises an L-shaped lever transfer link 60a, having first arm 61a and second arm 62a that pivot about hinge axis 54a, and pitch rod 64a. Pitch rod 64a is coupled at one end to the end of pitch horn 65a of rotor blade 19a by spherical joint 58a. Pitch rod 64a is coupled at the other end to the end of second arm 62a by spherical joint 55a. The end of first arm 61a of transfer link 60a is coupled to the outer end of follower 40a by spherical joint 51a. Spherical bearing 51a couples follower 40a to the end of first arm 61a of transfer link 60a at coupling center 52a.

As shown in FIG. 3, spherical bearing 51a is a rotary coupling about center 52a between first arm 61a of linkage 50a and follower 40a. Follower 40a has an inner race 95a orientated about coupling center 52a such that it rotates with rotation of follower 40a. Race 95a has a spherical inner diameter surface orientated about center 52a. The end portion of arm 61a, opposite to fulcrum portion 63a, extends through and is in linear sliding engagement with a through-bore in ball 96a. Ball 96a has an outer spherical diameter surface orientated about center 52a and is retained in race 95a of follower 40a, with the outer surface of ball 96a in spherical sliding engagement with the inner surface of race 95a. Thus, race 95a rotates with rotation of follower 40a, and ball 96a is rotatable with arm 61a in at least two degrees of motion about coupling center 52a relative to follower 40a. The shaft end portion of arm 61a may slide in the through-bore of ball 96a and is in linear sliding engagement with ball 96a such that arm 61a may translate linearly through coupling center 52a relative to ball 96a. Spherical bearings 51b, 51c and 51d are configured between linkages 50b, 50c, and 50d and followers 40b, 40c, 40d, respectively, in substantially the same manner.

Spherical bearing 55a is a rotary coupling about center 56a between arm 62a of transfer link 60a and pitch rod 64a. The end portion of pitch rod 64a has a race with a spherical inner diameter surface orientated about coupling center 56a. Arm 62a has a clevis pin rotationally supporting a ball with an outer spherical diameter surface orientated about coupling center 56a. The ball of arm 62a is retained in the race of pitch rod 64a, with the outer surface of the ball in spherical sliding engagement with the inner surface of the race. Thus, the race of pitch rod 64a and the ball of arm 62a may rotate in at least two degrees of motion about coupling center 56a relative to each other. Spherical bearings 55b, 55c and 55d are configured between links 60b, 60c and 60d and rods 64b, 64c and 64d, respectively, in substantially the same manner.

Similarly, spherical bearing 58a is a rotary coupling about center 59a between pitch horn 65a of rotor blade 19a and pitch rod 64a. The end portion of pitch rod 64a has a race with a spherical inner diameter surface orientated about coupling center 59a. Pitch horn 65a has a clevis pin rotationally supporting a ball with an outer spherical diameter surface orientated about coupling center 59a. The ball of pitch horn 65a is retained in the race of pitch rod 64a, with the outer surface of the ball in spherical sliding engagement with the inner surface of the race. Thus, the race of pitch rod 64a and the ball of pitch horn 65a may rotate in at least two degrees of motion about coupling center 59a relative to each other. Spherical bearings 58b, 58c and 58d are configured between pitch horns 65b, 65c and 65d and rods 64b, 64c and 64d, respectively, in substantially the same manner.

While in the above embodiment couplings 51a, 51b, 51c, 51d, 55a, 55b, 55c, 55d, 58a, 58b, 58c and 58d comprise spherical bearings, it is contemplated that other various alternative rotational couplings or pivot joints may be employed. For example, and without limitation, gimbal or universal joint type couplings may be used as alternatives.

Blade hub 22 and hinge hub 25 are fixed to rotor shaft 18 of rotor 17. Blade hub 22 with rotor blade 19a, and hinge hub 25 with hinge joint 53a, are stacked axially relative to central axis 20. Coupling center 59a of pitch rod 64a is offset fixed pitch horn distance 66a from pitch axis 24a. Coupling center 59a of pitch rod 64a is offset axially from hinge axis 54a by a variable axial pitch link distance 70a that varies as a function of radial distance 83a between coupling center 52a and central axis of rotation 20. Motor 30a and follower 40a with coupling 51a are stacked axially below hinge hub 25 relative to central axis 20.

As show, transfer link 60a pivots about hinge axis 54a. Hinge axis 54a is positioned tangent to a circle having radius 68 about central axis 20 such that transfer link 60a pivots in a vertical plane B that is radial to central axis 20. With lever arms 61a and 62a, elbow 63a at hinge 53a acts as a fulcrum. Radial movement of coupling center 52a towards central axis 20 causes coupling center 56a to rotate about hinge axis 54a down and away from blade hub 22, which, via pitch rod 64a and pitch horn 65a, rotates blade 19a in a first direction 73 about pitch axis 24a. Radial movement of coupling center 52a away from central axis 20 causes coupling center 56a to rotate about hinge axis 54a up and towards blade hub 22, which, via pitch rod 64a and pitch horn 65a, rotates blade 19a in a second direction 72 about pitch axis 24a.

Figure 5:
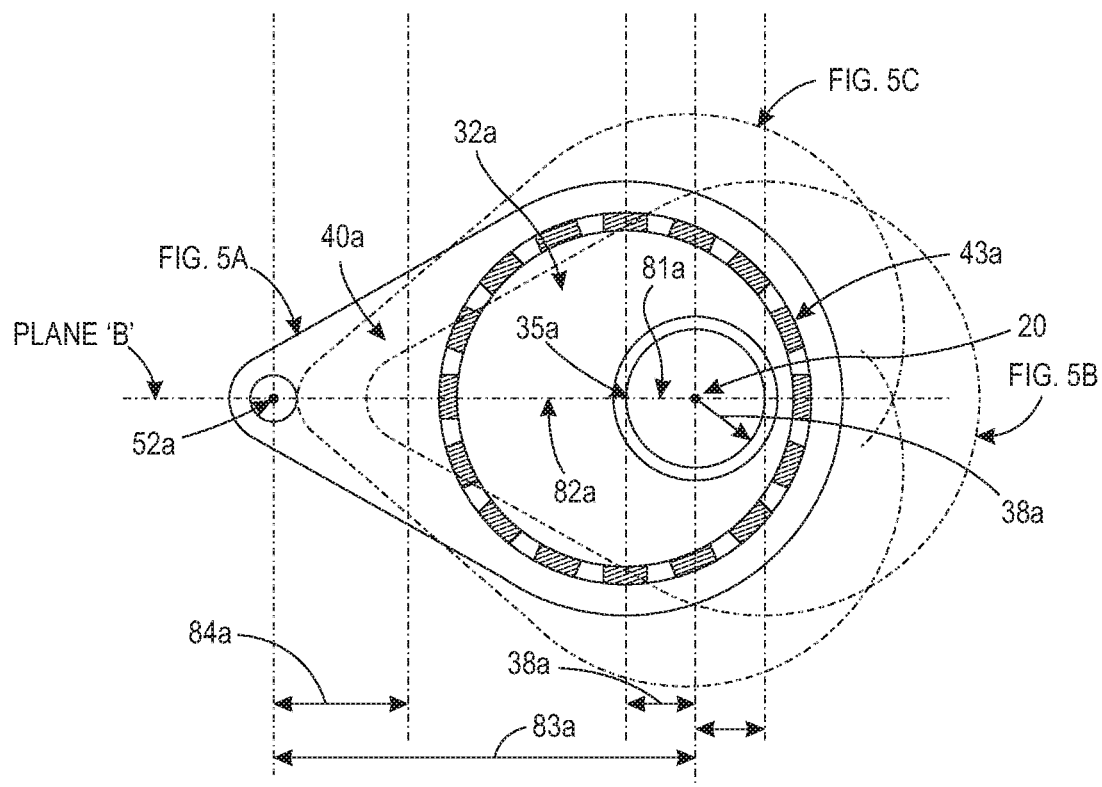
FIG. 5 is a top plan diagram view of the assembly shown in FIG. 4.
Figure 5A:
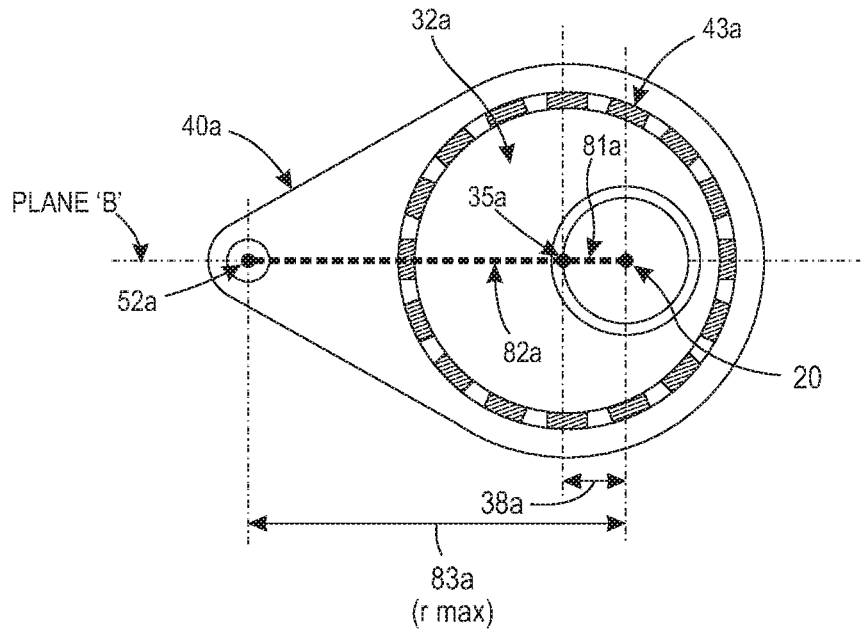
FIG. 5A is a top plan diagram view of the assembly shown in FIG. 5 in an upper pitch angle limit configuration.
Figure 5B:
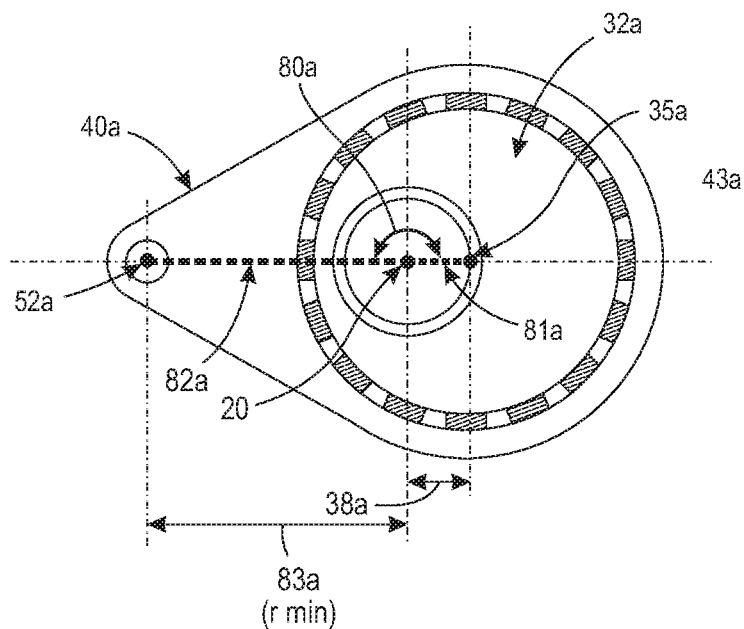
FIG. 5B is a top plan diagram view of the assembly shown in FIG. 5 in lower pitch angle limit configuration.

Based on the angular displacement between main rotor 17 and drive rotor 32a, coupling center 52a has a selectively variable radial displacement distance 83a (r) from central axis 20 ranging from a minimum distance (r min), as shown in FIG. 5B, to a maximum distance (r max), as shown in FIG. 5A. With the configuration of linkage 50a, based on the radial displacement distance 83a (r) of coupling center 52a from central axis 20, coupling center 59a will have a selectively variable pitch angle 71a (∠p) about pitch axis 24a between upper angular pitch angle limit 74a and lower angular pitch angle limit 75a. As shown, the pitch angle 71a (∠p), between upper limit pitch angle 74a and lower limit pitch angle 75a, is selectively varied by selectively varying radial displacement distance 83a (r) from central axis 20 from a minimum distance (r min) to a maximum distance (r max). In this embodiment, the maximum radial displacement distance 83a from central axis 20 (r max) corresponds to rotor blade 19a having first angular pitch angle limit 74a, and the minimum radial displacement distance 83a from central axis 20 (r min) corresponds to rotor blade 19a having second angular pitch angle limit 75a. Thus, system 15 provides rotor blade 19a with a pitch angle rotational range 71a between upper limit 74a and lower limit 75a that is based on and a direct function of the radial linear displacement range 84a of coupling center 52a from central axis 20. Based on the radial displacement distance 83a (r) of coupling center 52a from central axis 20, blade 19a has a selectively variable pitch about pitch axis 24a.

With the configuration of linkage 50a in this embodiment, based on the radial displacement distance 83a (r) of coupling center 52a from central axis 20, coupling center 59a will have a selectively variable axial displacement distance 70a (y) from hinge axis 54a ranging from a minimum distance (y min) to a maximum distance (y max). Based on the axial displacement distance 70a, blade 19a has a selectively variable pitch about pitch axis 24a.

Driven axis 35a and coupling center 52a have a selectively variable displacement angle 80a (∠d) about central axis 20 defined by the inclusive angle between line 81a, extending between central axis 20 and driven axis 35a perpendicular to central axis 20, and line 82a extending between central axis 20 and coupling center 52a perpendicular to central axis 20. As shown, the magnitude of radial displacement distance 83a (r) from central axis 20, between a minimum distance (r min) and a maximum distance (r max), is selectively varied by selectively varying displacement angle 80a between zero degrees and 180 degrees. As shown, the relative rotation of main rotor 17 and drive rotor 32a may be controlled to vary displacement angle 80a, and thereby vary radial displacement distance 83a (r), and thereby vary axial displacement distance 70a (y) and pitch angle 71a (∠p) between pitch limits 74a and 75a, to produce a desired pitch of rotor blade 19a about pitch axis 24a within the operational range 71a of rotor blade 19a.

Hinge joint 53a and hinge axis 54a are driven about central axis 20 via main rotor 17 in a circular path of diameter 68. Hinge joint 53a is selectively driven by main rotor 17 in a primary rotational direction at a primary rotational frequency (ω2). Thus, rotation of main rotor 17 about axis 20 causes rotation of hinge joint 53a about axis 20. Because transfer link 60a between hinge hub 25 and follower 40a rotationally connects hinge joint 53a and main rotor 17 to follower 40a, follower 40a rotates with main rotor 17. Follower 40a will rotate with main rotor 17 about central axis 20 in the primary rotational direction and at the primary rotational frequency (ω2). Thus, rotation of main rotor 17 about axis 20 causes rotation of follower 40 in the same direction and at the same rotational speed.

Driven axis 35a is moved about central axis 20 via drive rotor 32a in a circular path of radius 38a. Rotor 32a is selectively driven by motor 30a in the primary rotational direction at a rotational frequency (ω1). Thus, rotation of rotor 32a about axis 20 moves driven axis 35a about axis 20. Accordingly, driven axis 35a may be selectively driven to rotate about axis 20 at the same time as coupling center 52a is driven to rotate about axis 20. When driven axis 35a and coupling center 52a are driven to rotate about axis 20 at the same speed (ω1=ω2), displacement angle 80a (∠d), and thereby radial displacement distance 83a (r), axial displacement distance 70a (y) and pitch angle 71a (∠p), are maintained at a constant. To vary displacement angle 80a (∠d), and thereby radial displacement distance 83a (r), axial displacement distance 70a (y) and pitch angle 71a (∠p) to produce a desired pitch angle, driven axis 35a is driven my motor 30a to rotate about axis 20 at a different speed than the speed of rotation of coupling center 52a about central axis 20 (ω1≠ω2) until the desired radial displacement distance 83a (r), axial displacement distance 70a (y), and pitch angle 71a (∠p) is achieved. The relative angular positions of driven axis 35a and coupling center 52a to each other about central axis 20 is controlled to control radial distance 83a of coupling center 52a from central axis 20. Linkage 50a then translates any radial displacement 84a relative to central axis 20 into rotational displacement 71a of rotor blade 19a about pitch axis 24a. In this embodiment, such distance can range from a maximum distance (r max) when displacement angle 80a is zero degrees, such that driven axis 35a and coupling center 52a are angularly aligned about central axis 20 and pitch angle 71a is at limit 74a, as shown in FIGS. 5A and 6A, to a minimum distance (r min) when displacement angle 80a is 180 degrees, such that driven axis 35a and coupling center 52a are the furthest from each other, and pitch angle 71a is at a limit 75a, as shown in FIGS. 5B and 6B.

Figure 6A:
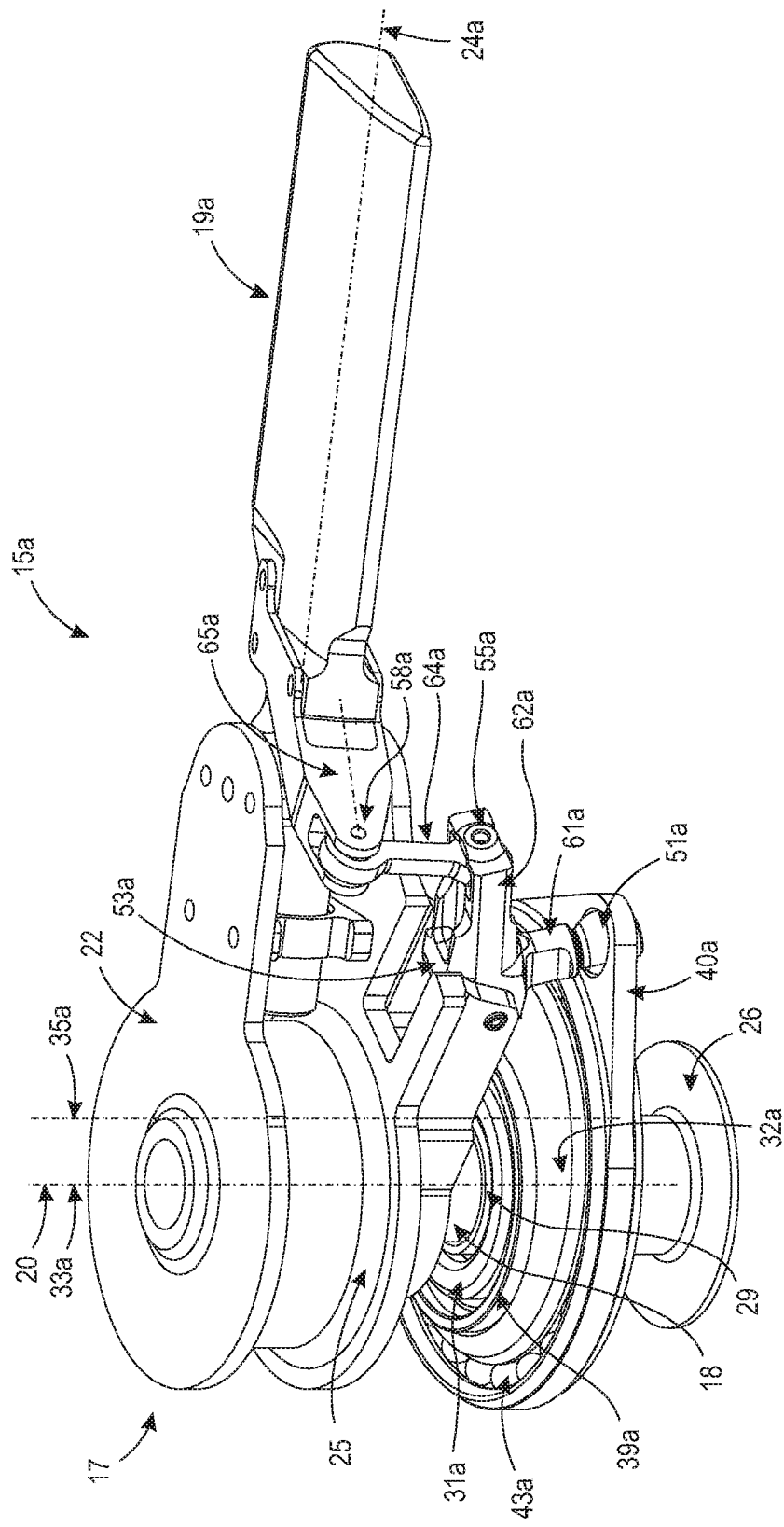
FIG. 6A is a representative perspective view of a pitch control subsystem for the first of the rotor blades shown in FIG. 1 in an upper pitch angle limit configuration.

FIGS. 5A and 6A show the alignment between drive rotor 32a and driven axis 35a about axis 20 and hinge hub 25 and coupling center 52a about axis 20 when controlled to provide an upper limit pitch angle 74a about pitch axis 24a. In this embodiment and upper limit pitch configuration, drive rotor 32a is controlled such that displacement angle 80a is about zero degrees and axial distance 70a is at a maximum (y max). As shown, with displacement angle 80a at zero degrees, driven axis 35a of drive rotor 32a and coupling center 52a of follower 40a are angularly aligned about central axis 20.

Figure 6B:
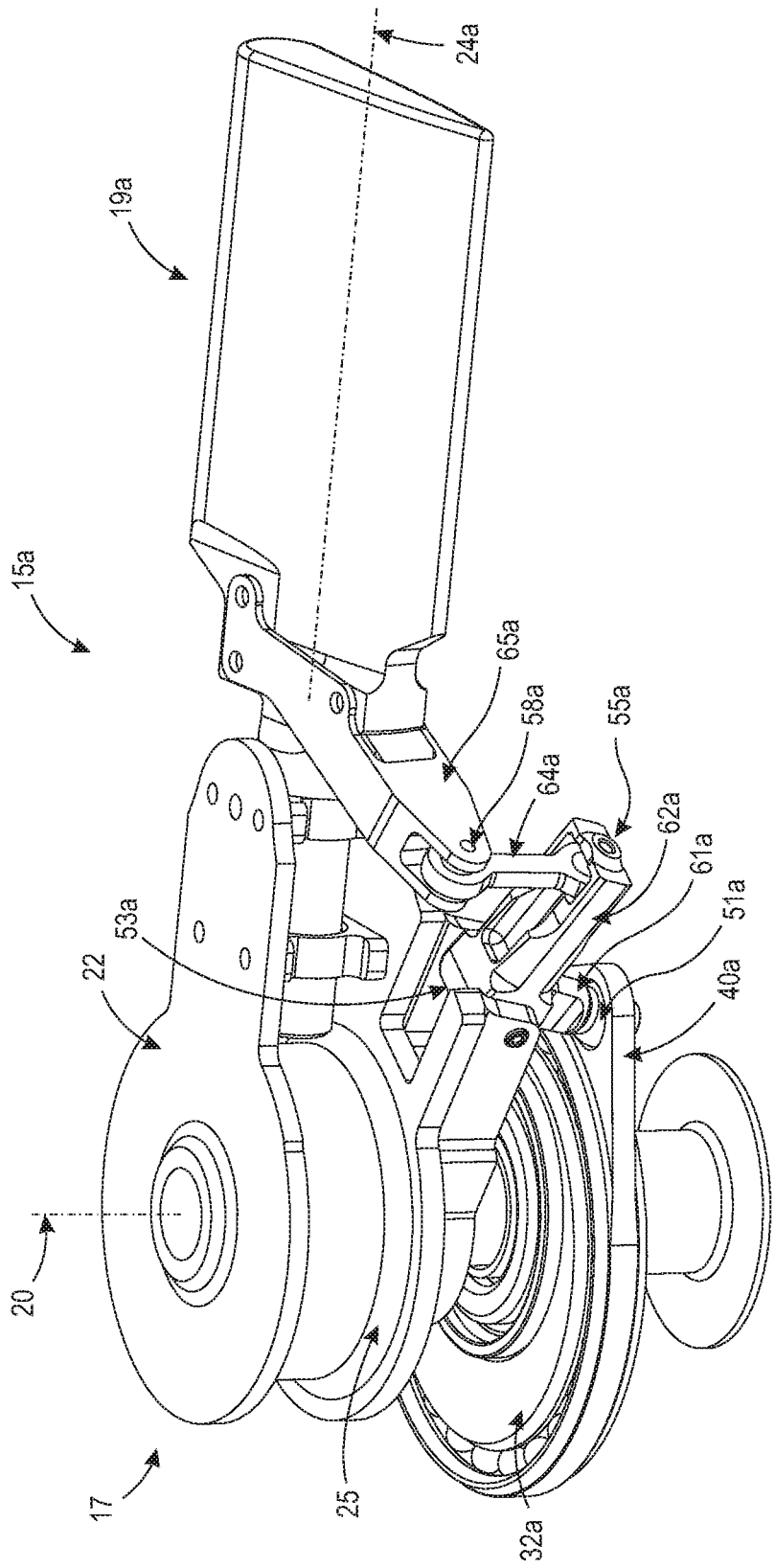
FIG. 6B is a representative perspective view of a pitch control subsystem for the first of the rotor blades shown in FIG. 1 in a lower pitch angle limit configuration.

FIGS. 5B and 6B show the alignment between drive rotor 32a and driven axis 35a about axis 20 and hinge hub 25 and coupling center 52a about axis 20 when controlled to provide a lower limit pitch angle 75a about pitch axis 24a. In this embodiment and lower limit pitch configuration, drive rotor 32a is controlled such that displacement angle 80a is about 180 degrees and axial distance 70a is at a minimum (y min). As shown, with displacement angle 80a at 180 degrees, driven axis 35a of drive rotor 32a and coupling center 52a of follower 40a are angularly separated 180 degrees about central axis 20. In this embodiment and minimum pitch configuration, driven axis 35a of drive rotor 32a is controlled such that radial displacement distance 83a is at a minimum distance (r min) from central axis 20.

Figure 5C:
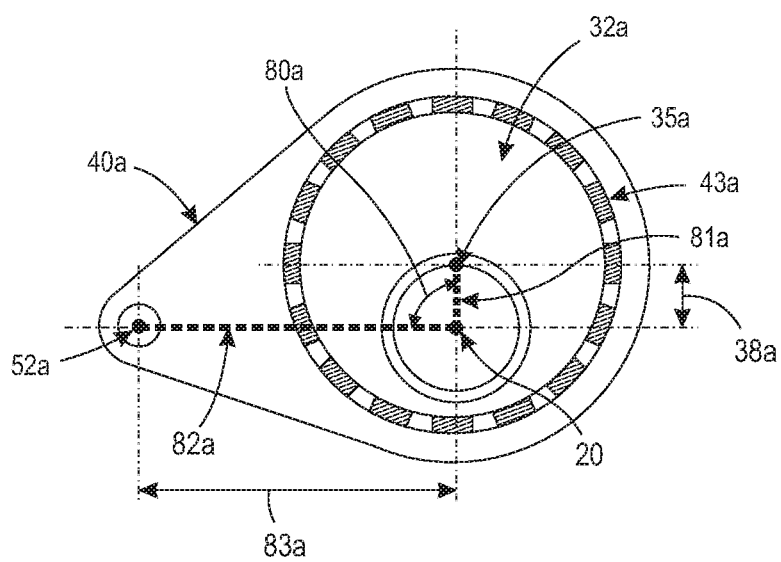
FIG. 5C is a top plan diagram view of the assembly shown in FIG. 5 in an intermediate pitch angle limit configuration.
Figure 6C:
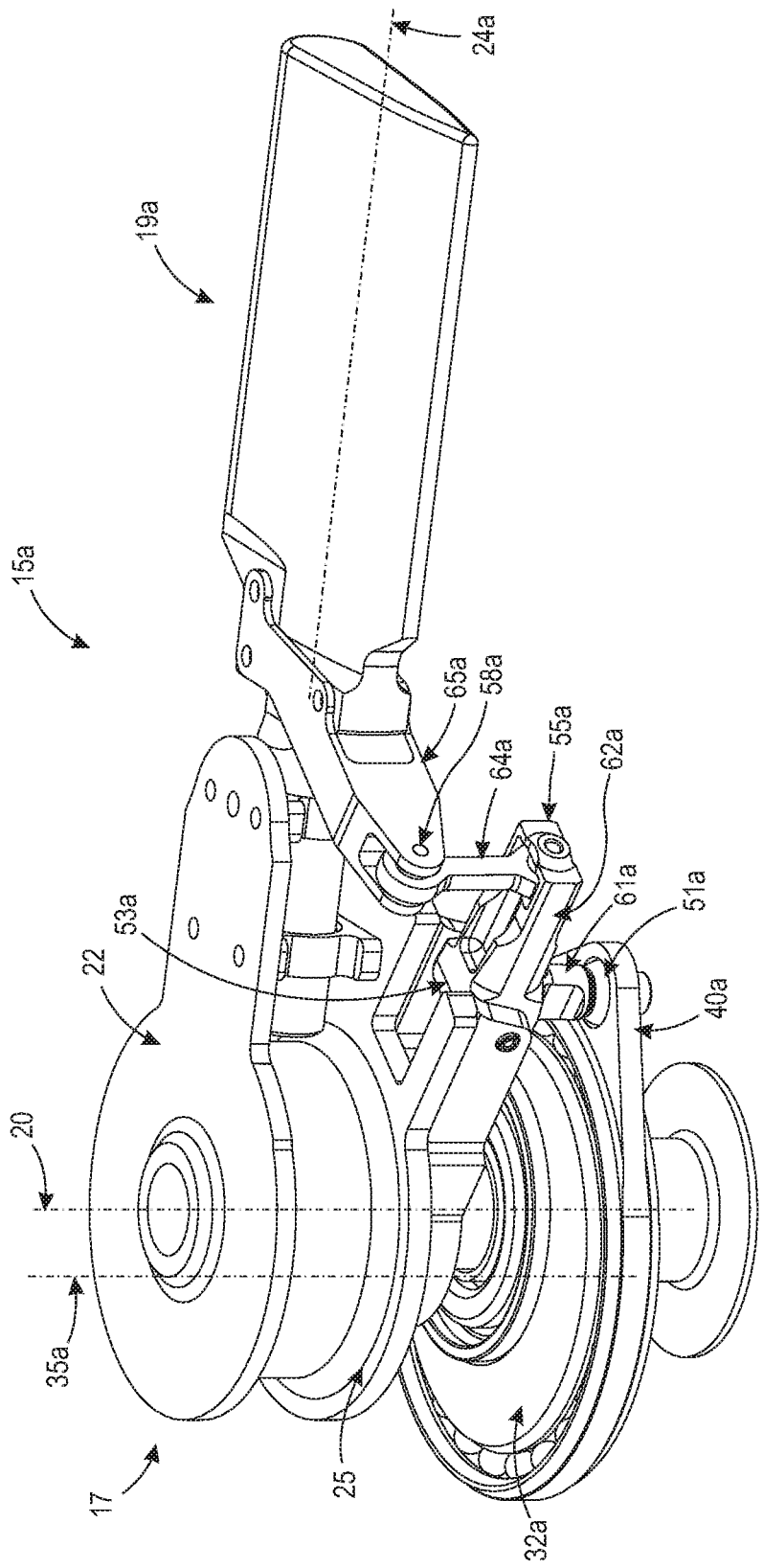
FIG. 6C is a representative perspective view of a pitch control subsystem for the first of the rotor blades shown in FIG. 1 in an intermediate pitch angle limit configuration.

In an intermediate pitch configuration shown in FIGS. 5C and 6C, the circular motion of driven axis 35a of drive rotor 32a can be controlled to provide intermediate pitch angle 76a, which in this embodiment is identified as a neutral pitch angle. To change the pitch angle 71a from pitch angle limit 74a, the speed of rotation (ω1) of drive rotor 32a relative to the speed of rotation of main rotor 17 (ω2), and the relative speeds of rotation of driven axis 35a and coupling center 52a, respectively, are controlled such that displacement angle 80a is increased above 0 degrees and displacement distance 83a is less than the maximum (r<max) and axial distance 70a is less than the maximum (y<max).

The location of the driven axis 35a, coupling center 52a and coupling center 59a relative to each other and central axis 20 and pitch axis 24a are selected to provide the desired range of net radial displacement 84a and net pitch 71a.

To match the actual pitch angle to the desired pitch angle, the circular motion of drive rotor 32a is controlled between the upper limit pitch mode and the lower limit pitch mode to reach the desired pitch angle 71a. In this embodiment, the circular motion of drive rotor 32a, and resulting pitch angle 71a, is maintained at the desired orientation by controller 90 driving motor 30a relative to main rotor 17 such that motor 30a rotates drive rotor 32a and driven axis 35a about axis 20 at a first rotation speed (ω1) that is substantially the same as the rotational speed of main rotor 17 (ω2). Thus, the controller maintains the desired pitch by maintaining the speed constant between the speed of rotation of drive rotor 32a and driven axis 35a and the speed of rotation of main rotor 17 and coupling center 52a about axis 20, respectively. Once a desired relationship between drive rotor 32a and main rotor 17 is established, and displacement angle 80a is defined, the magnitude of pitch angle 71a is constant while drive rotor 32a and main rotor 17 spin about axis 20 in the same direction and at the same speed.

In this embodiment, the orientation of drive rotor 32a and driven axis 35a and main rotor 17 and coupling center 52a about axis 20 relative to each other, and resulting pitch angle 71a, is modified or varied by controller 90 driving motor 30a relative to main rotor 17 such that motor 30a rotates drive rotor 32a and driven axis 35a about axis 20 at a first rotation speed (ω1) that is not substantially equal to the rotational speed of main rotor 17 (ω2). Thus, controller 90 varies the desired pitch angle by varying the speed differential between the speed of rotation of drive rotor 32a and driven axis 35a about axis 20 and the speed of rotation of main rotor 17 and coupling center 52a about axis 20 from substantially 1 to 1. Once the desired operational pitch angle is reached, controller 90 returns to a speed differential between the speed of rotation of drive rotor 32a and driven axis 35a about axis 20 and the speed of rotation of main rotor 17 and coupling center 52a about axis 20, of substantially 1 to 1.

Figure 7A:
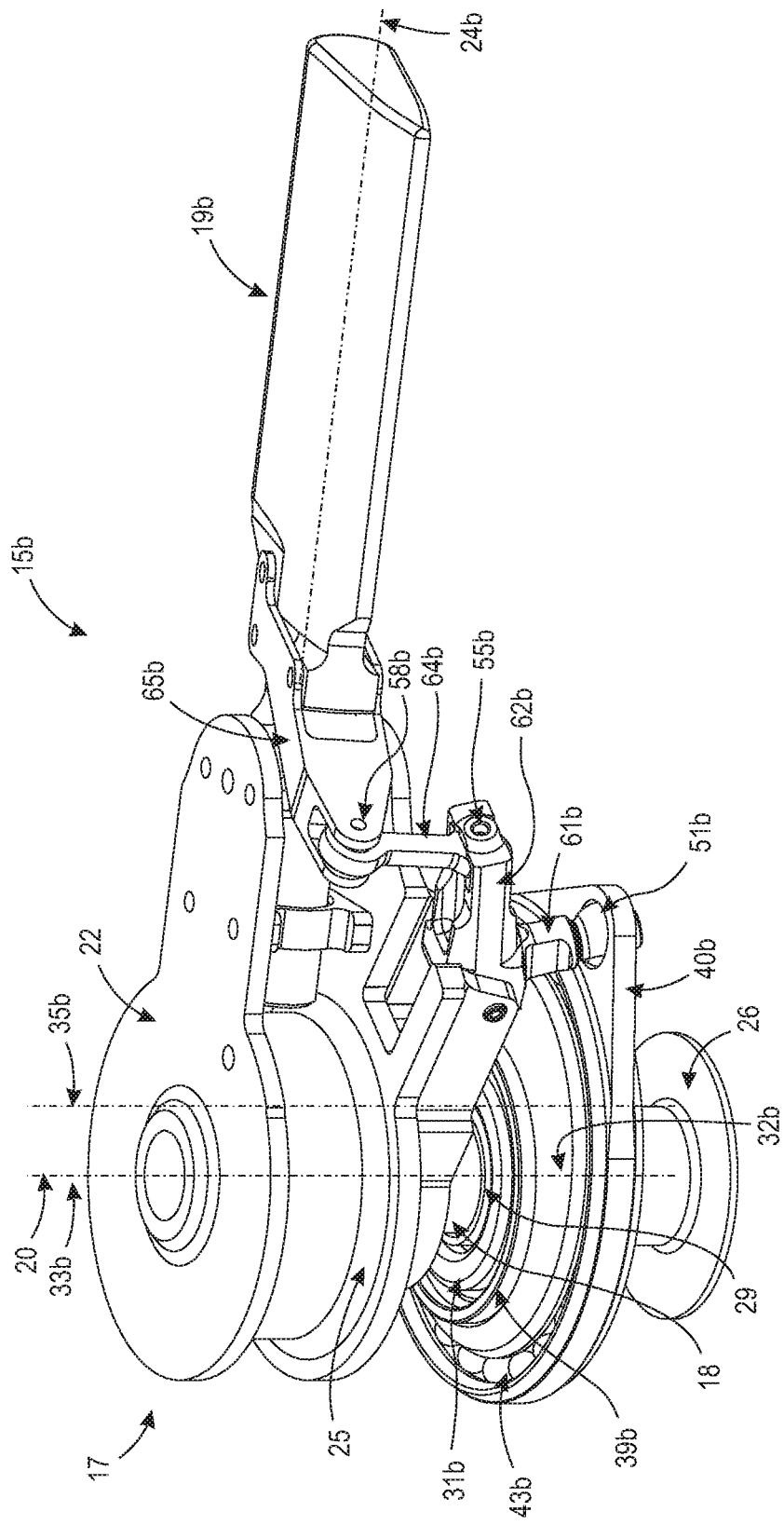
FIG. 7A is a representative perspective view of a pitch control subsystem for the second of the rotor blades shown in FIG. 1 in an upper pitch angle limit configuration.
Figure 7B:
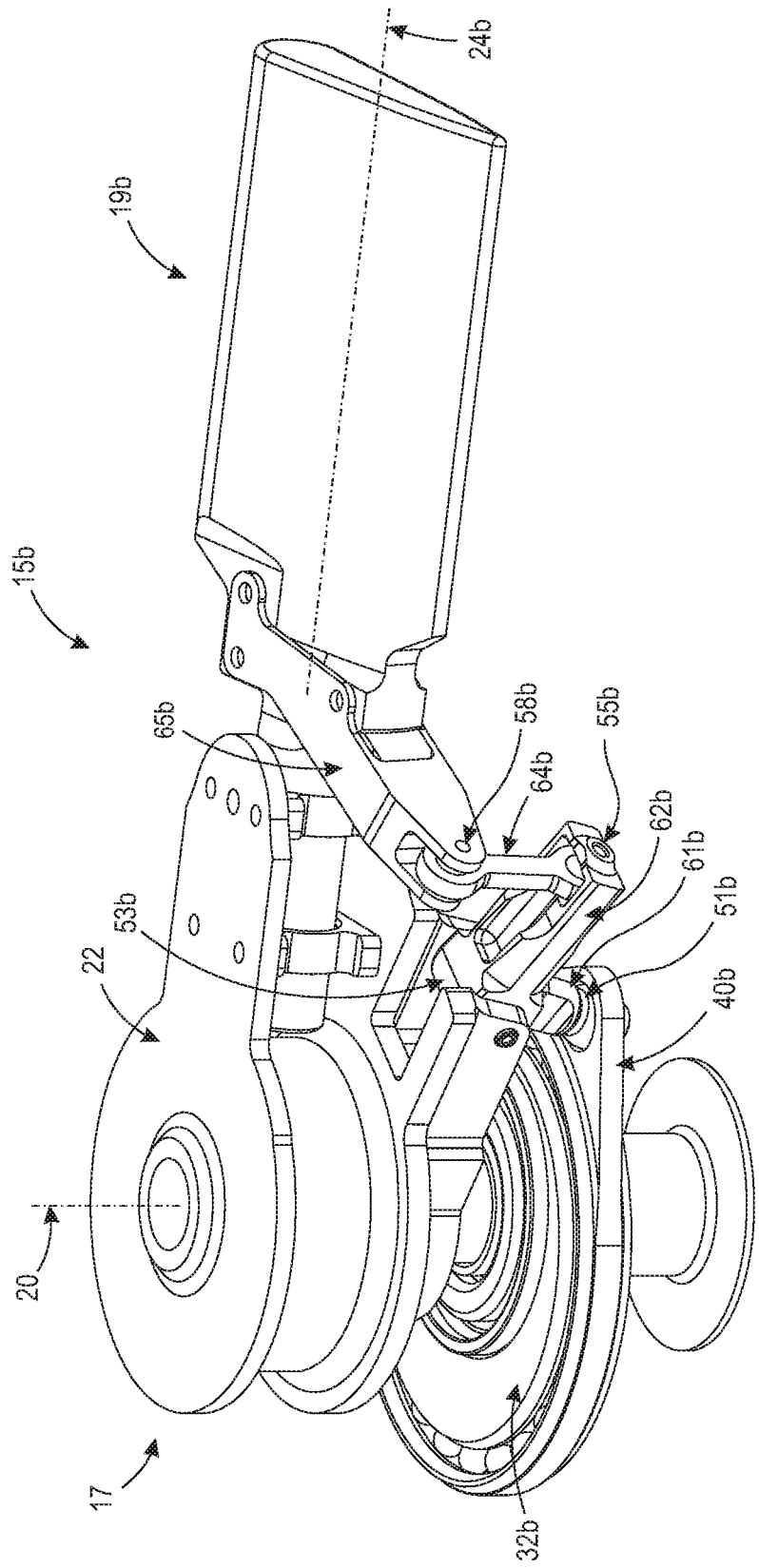
FIG. 7B is a representative perspective view of a pitch control subsystem for the second of the rotor blades shown in FIG. 1 in a lower pitch angle limit configuration.
Figure 7C:
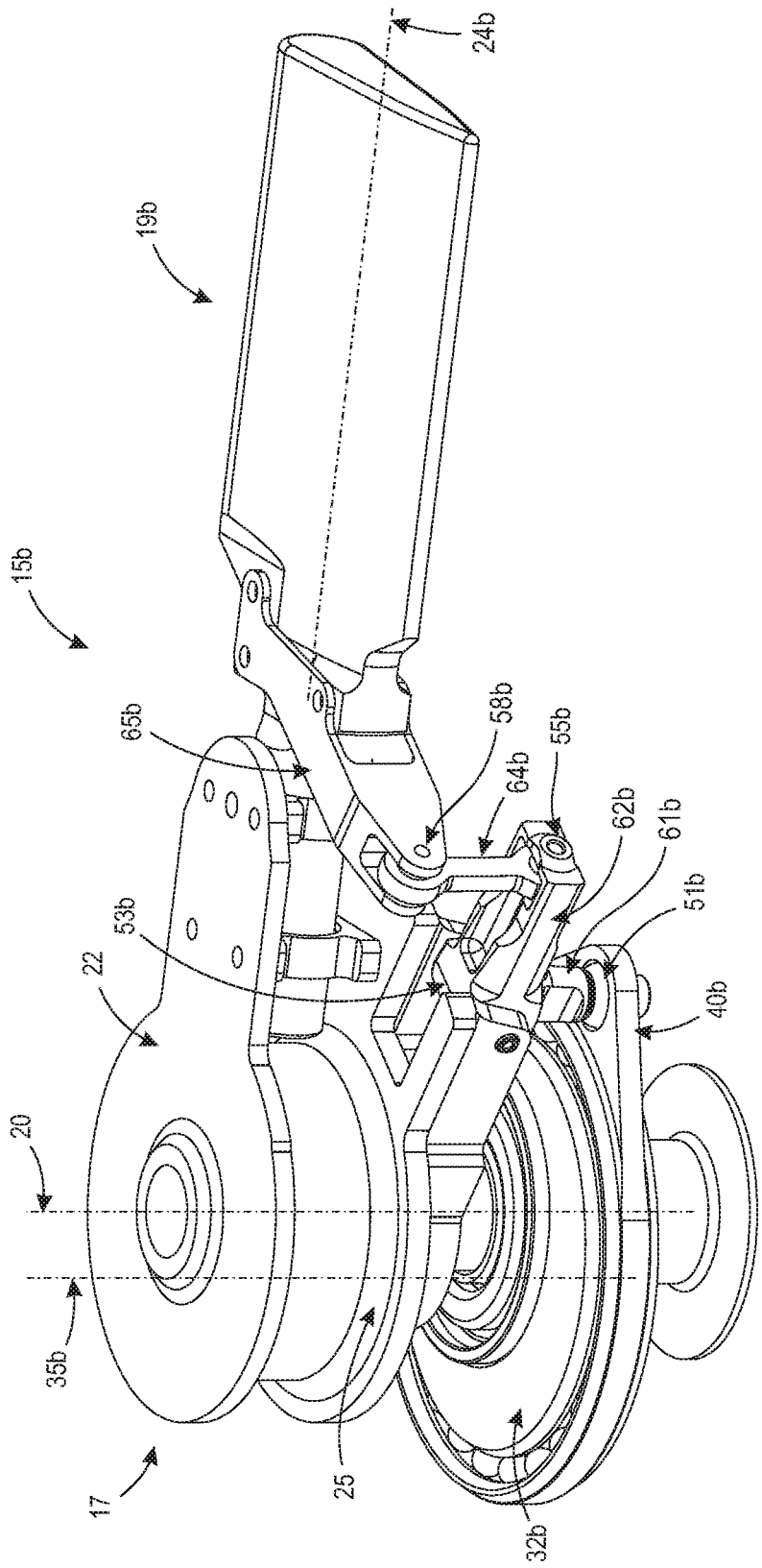
FIG. 7C is a representative perspective view of a pitch control subsystem for the second of the rotor blades shown in FIG. 1 in an intermediate pitch angle limit configuration.
Figure 8A:
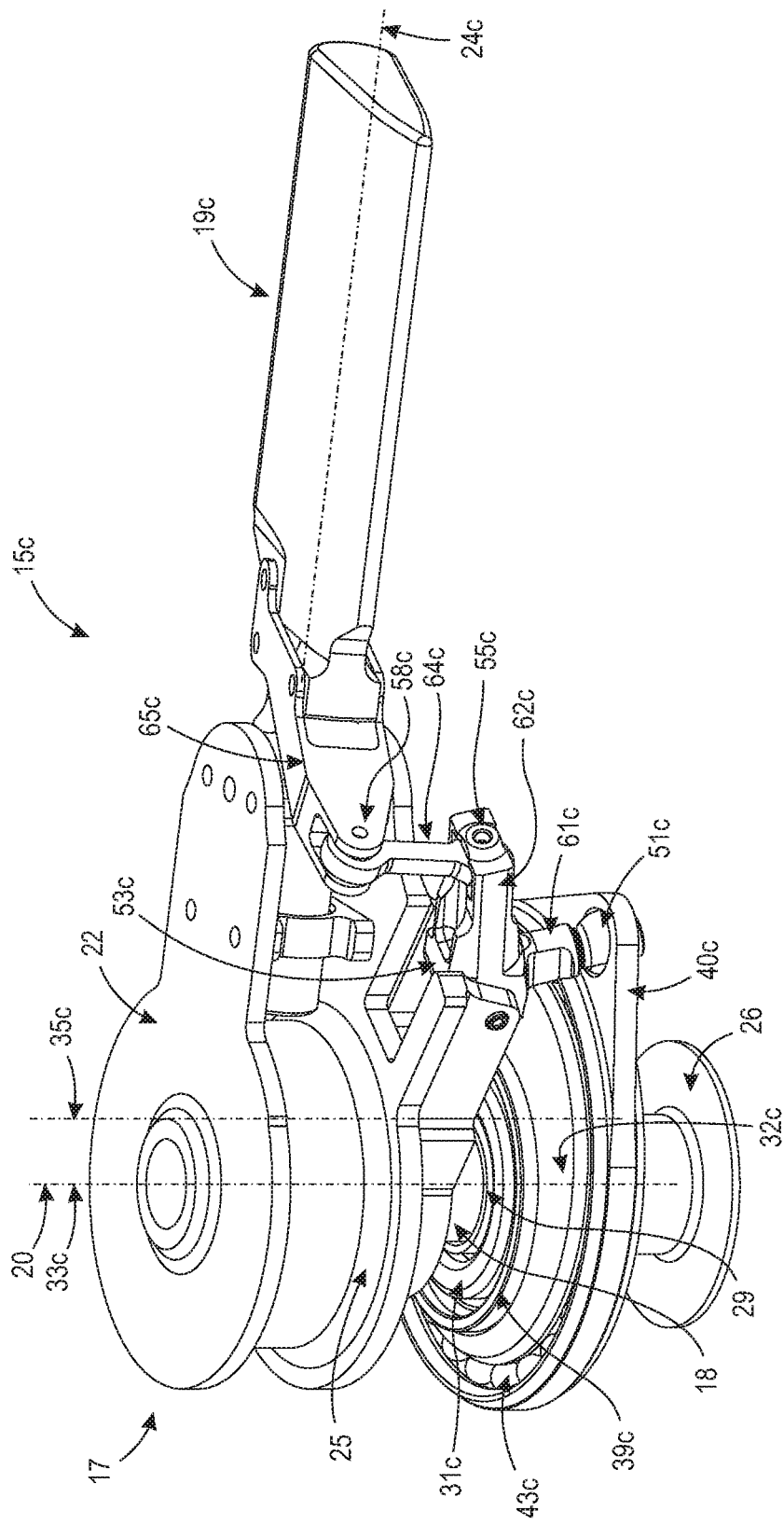
FIG. 8A is a representative perspective view of a pitch control subsystem for the third of the rotor blades shown in FIG. 1 in an upper pitch angle limit configuration.
Figure 8B:
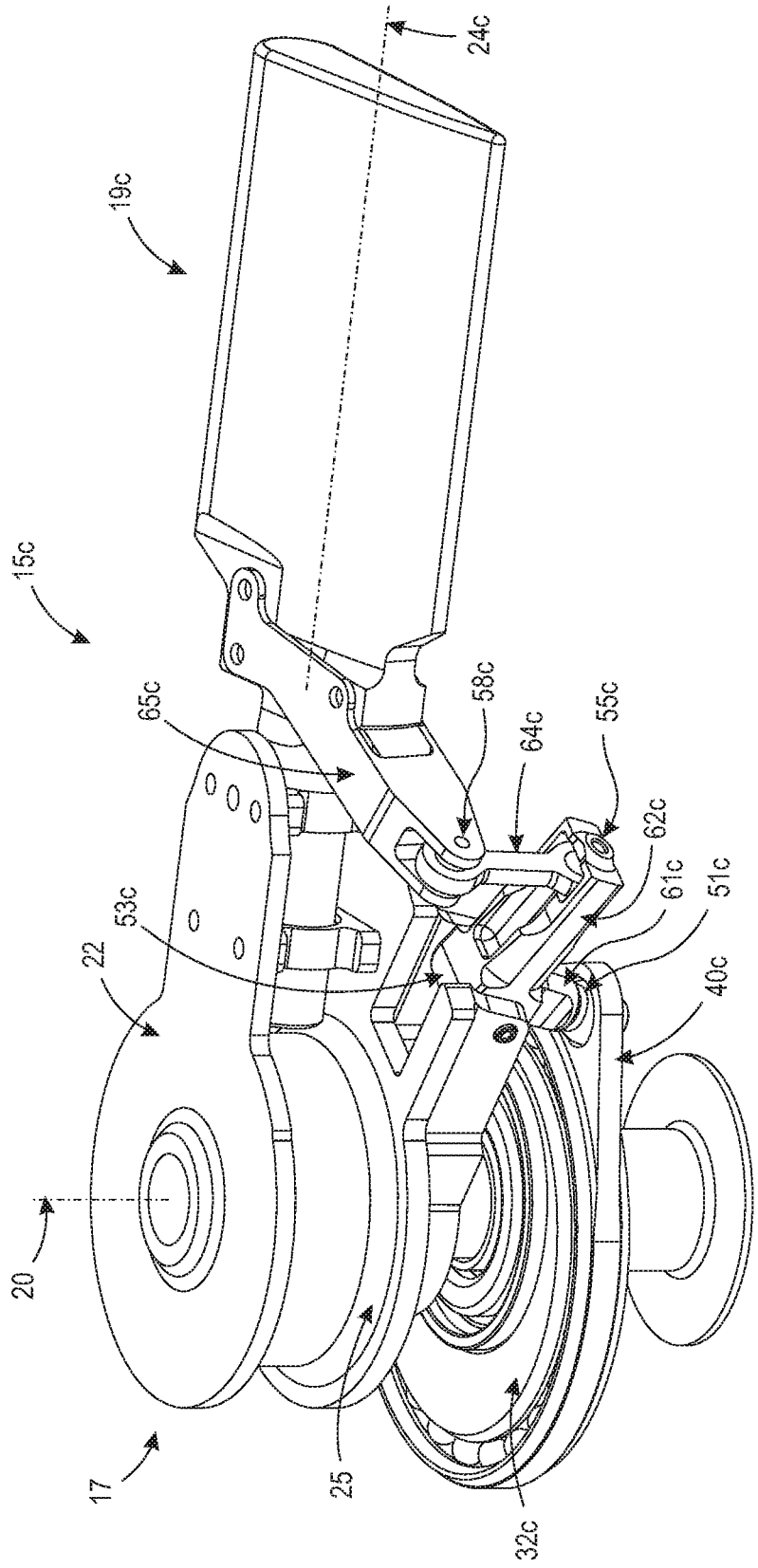
FIG. 8B is a representative perspective view of a pitch control subsystem for the third of the rotor blades shown in FIG. 1 in a lower pitch angle limit configuration.
Figure 8C:
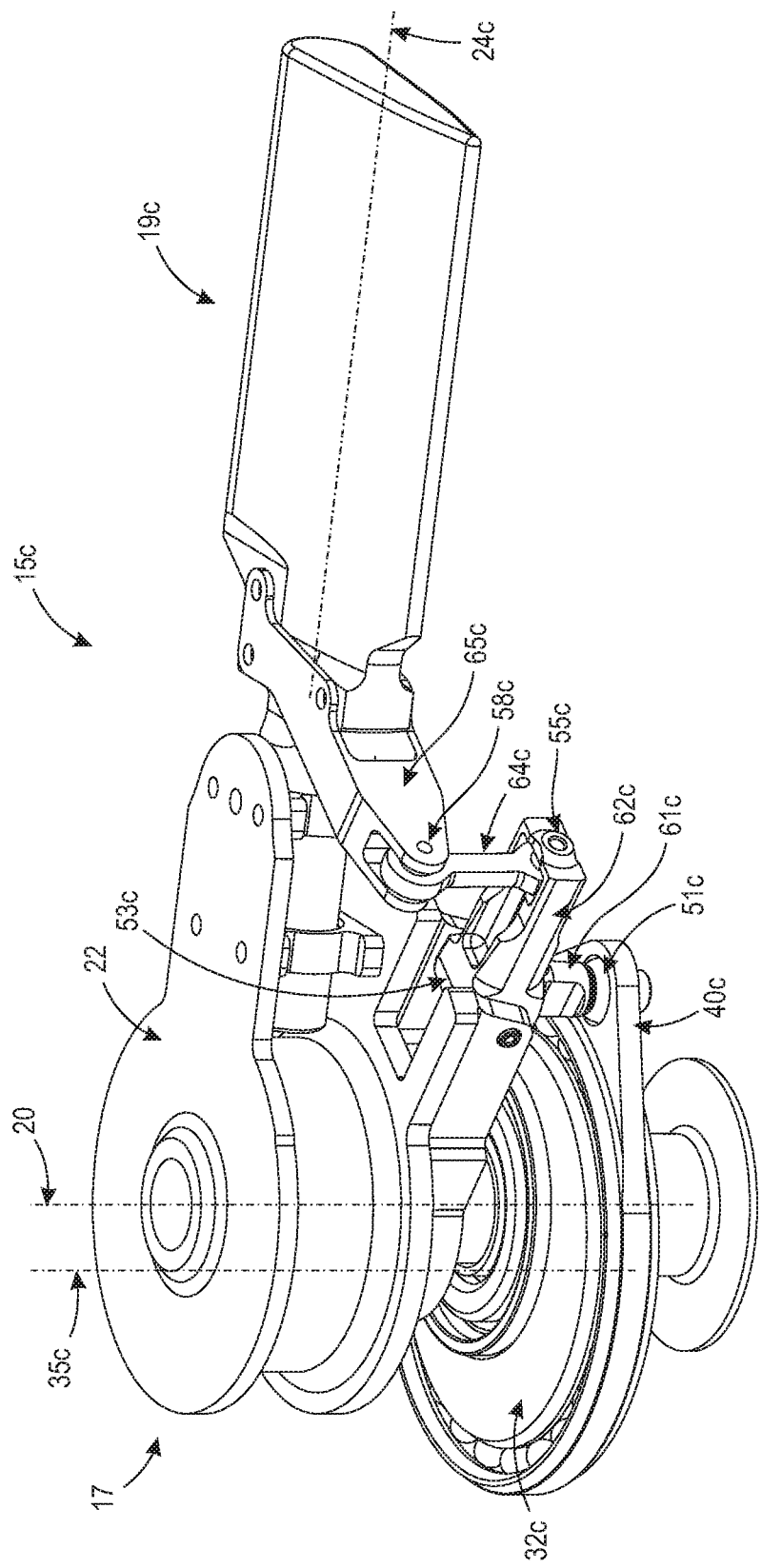
FIG. 8C is a representative perspective view of a pitch control subsystem for the third of the rotor blades shown in FIG. 1 in an intermediate pitch angle limit configuration.
Figure 9A:
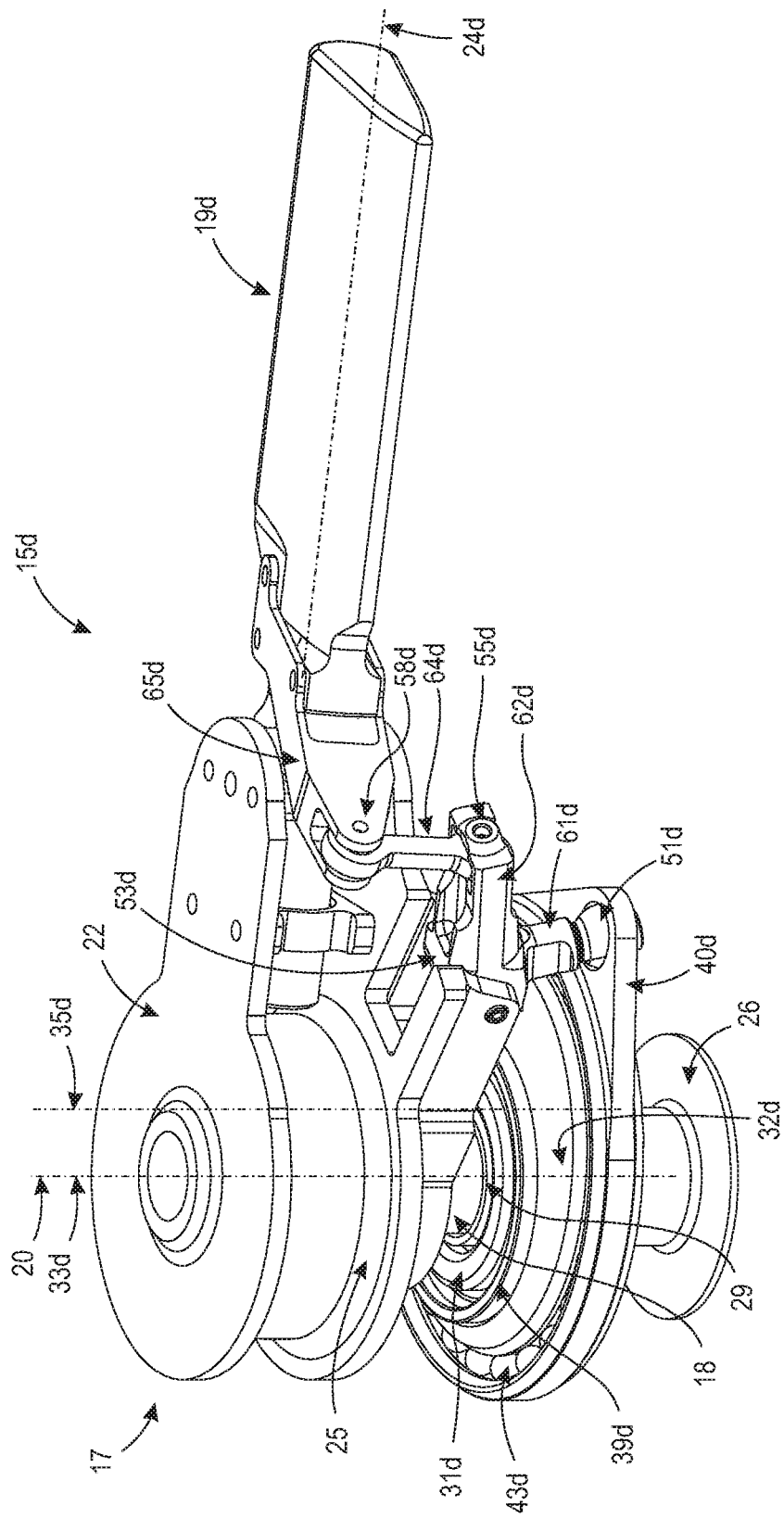
FIG. 9A is a representative perspective view of a pitch control subsystem for the fourth of the rotor blades shown in FIG. 1 in an upper pitch angle limit configuration.
Figure 9B:
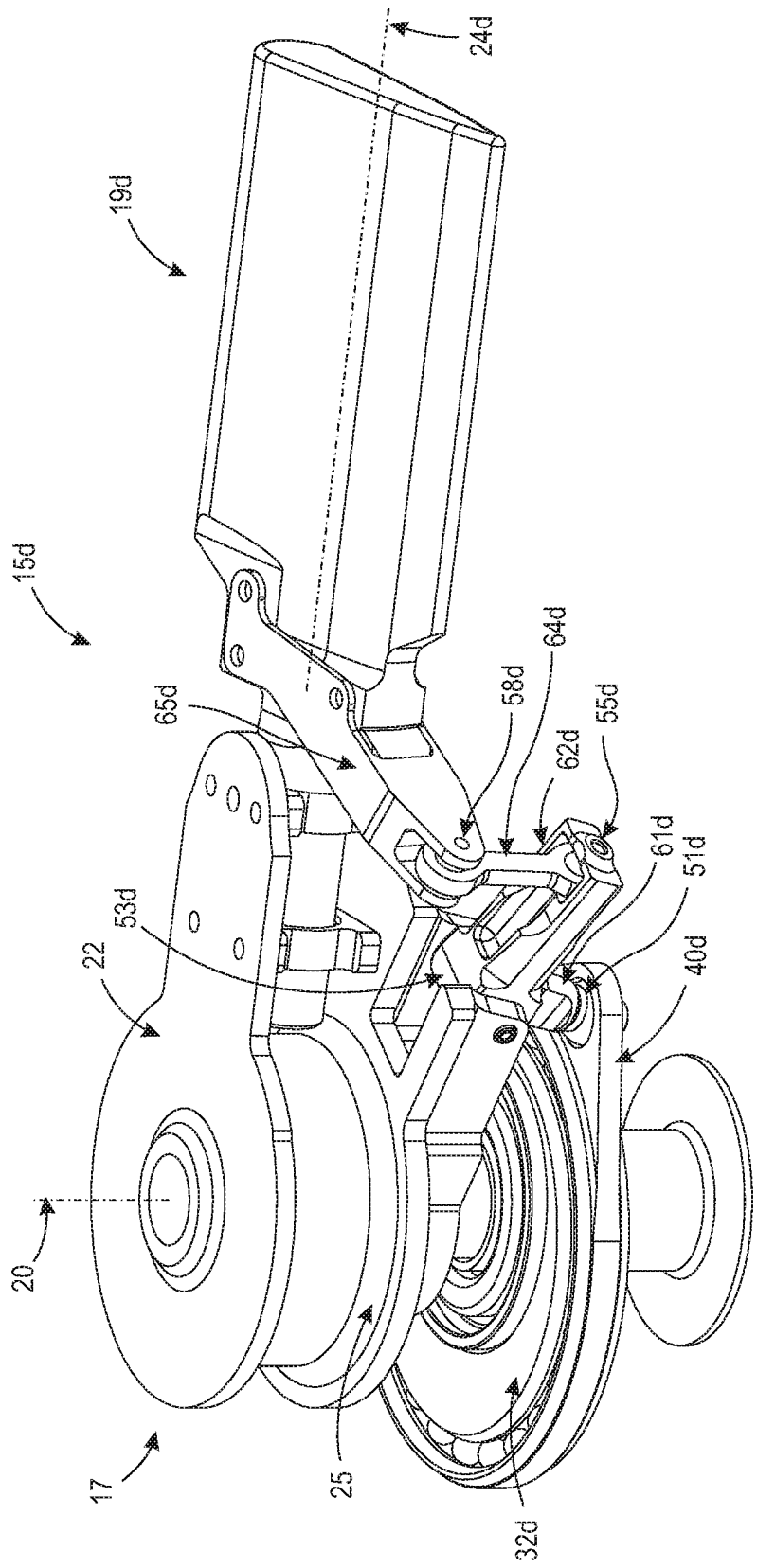
FIG. 9B is a representative perspective view of a pitch control subsystem for the fourth of the rotor blades shown in FIG. 1 in a lower pitch angle limit configuration.
Figure 9C:
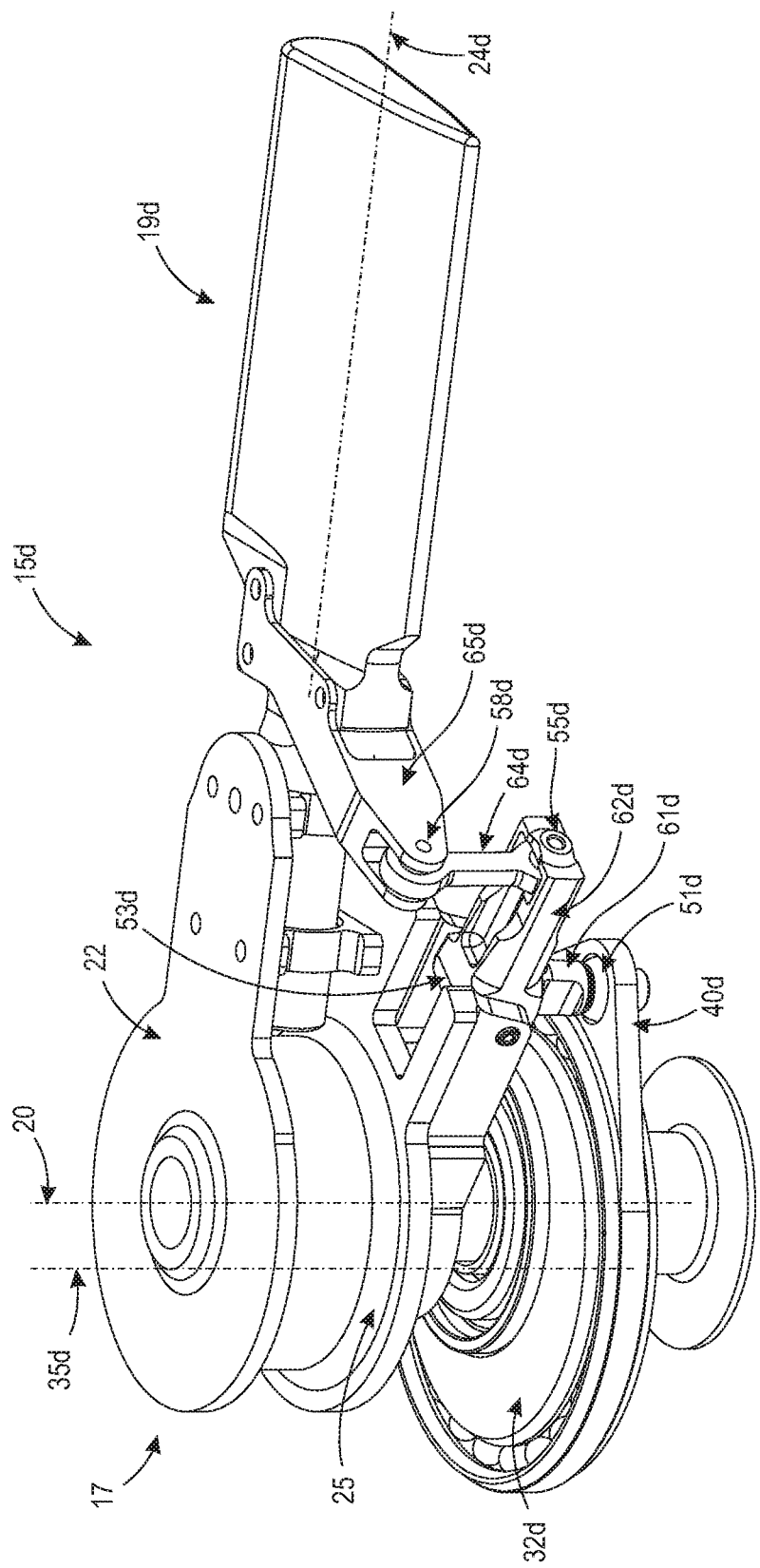
FIG. 9C is a representative perspective view of a pitch control subsystem for the fourth of the rotor blades shown in FIG. 1 in an intermediate pitch angle limit configuration.

A representative subassembly 15a of motor 30a, pitch follower 40a, linkage 50a and rotor blade 19a is shown in FIGS. 6A, 6B and 6C. The subassembly 15a is configured and operates in substantially the same manner as described above with respect to motor 30a, pitch follower 40a, linkage 50a and rotor blade 19a and as further illustrated in FIGS. 2, 3 and 10. A representative subassembly 15b of motor 30b, pitch follower 40b, linkage 50b and rotor blade 19b is shown in FIGS. 7A, 7B and 7C. The subassembly 15b of motor 30b, pitch follower 40b, linkage 50b and rotor blade 19b is configured and operates in substantially the same manner as described above with respect to subassembly 15a and motor 30a, pitch follower 40a, linkage 50a and rotor blade 19a and as further illustrated in FIGS. 2, 3, 6A, 6B, 6C and 10. A representative subassembly 15c of motor 30c, pitch follower 40c, linkage 50c and rotor blade 19c is shown in FIGS. 8A, 8B and 8C. The subassembly 15c of motor 30c, pitch follower 40c, linkage 50c and rotor blade 19c is configured and operates in substantially the same manner as described above with respect to subassembly 15a and motor 30a, pitch follower 40a, linkage 50a and rotor blade 19a and as further illustrated in FIGS. 2, 3, 6A, 6B, 6C and 10. A representative subassembly 15d of motor 30d, pitch follower 40d, linkage 50d and rotor blade 19d is shown in FIGS. 9A, 9B and 9C. The subassembly 15d of motor 30d, pitch follower 40d, linkage 50d and rotor blade 19d is configured and operates in substantially the same manner as described above with respect to subassembly 15a and motor 30a, pitch follower 40a, linkage 50a and rotor blade 19a and as further illustrated in FIGS. 2, 3, 6A, 6B, 6C and 10. In this manner, the pitch of each of rotor blades 19a, 19b, 19c and 19d is individually controlled independently of the other rotor blades.

In this embodiment, motors 30a, 30b, 30c and 30d are powered by 3 phase AC power source 79, rectified to DC by power control and an AC to DC rectifier 78. Because rotor blade pitch control system 15 is on the fuselage side of main rotor 17, a slip ring is not needed to convey power or control signals across a rotary gap to blade pitch control system 15.

Static mast 26 supports the electronics of rotor blade pitch control system 15, including microprocessor controller 90 and sensor packages 91a, 91b and 92. In this embodiment, controller 90 is configured to automatically control the operation of motors 30a, 30b, 30c and 30d. Controller 90 receives input signals, including inputs from flight control computer 89 of helicopter 16, and outputs command signals to motors 30a, 30b, 30c and 30d to individually control the speed of rotation of drive rotors 32a, 32b, 32c and 32d and displacement angles 80a, 80b, 80c, and 80d, respectively, independently of each other. To provide additional fault tolerance, rather than a common controller, separate controllers may be used to individually control each of motors 30a, 30b, 30c and 30d independently.

Controller 90 communicates with tachometer 92, which measures main rotor 17 rotational speed about central axis 20 relative to fuselage 21. However, alternative and/or additional sensors may be located on main rotor shaft 18, on hub 22 and/or on fuselage or airframe 21 to provide rotor shaft speed or operational frequency and feedback data, such as, without limitation, feedback drive rotor speed from sensor 91b and hinge 54 position and rotor blade pitch from sensor 91a. Sensors may also be installed in other locations. Additional numbers and types of sensor may be used in the system.

Based on sensor data, controller 90 controls the operation of rotor blade pitch control system 15. Controller 90 may control operation of rotor blade pitch control system 15 based on data such as airspeed, blade pitch angle, amount of rotor thrust, and/or other aircraft parameters and dynamics.

Figure 10:
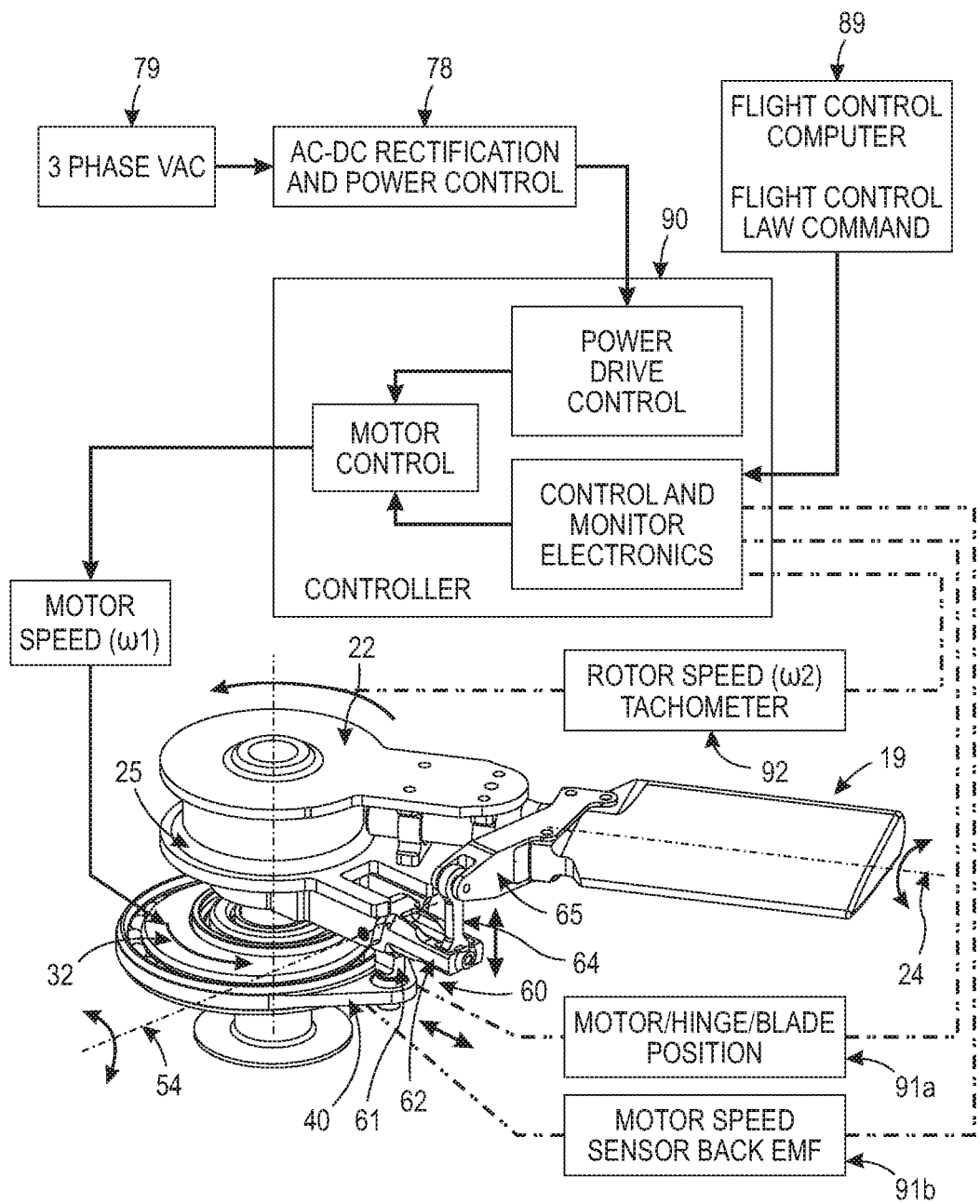
FIG. 10 is a schematic diagram of the control system for the pitch control subsystems shown in FIG. 1.

As shown in FIG. 10, controller 90 receives input signals from a plurality of sensors that measure various operating parameters of helicopter 16 and provides output commands as a function of such measurements. Controller 90 is configured to receive and execute software stored in a memory for executing individual commands to motors 30a, 30b, 30c and 30d. The software may be implemented via a non-transitory computer readable medium having computer executable instructions that when executed by the processor generate a command.

In particular, controller 90 sends commands to motors 30*a*, 30*b*, 30*c* and 30*d* based at least in part on tachometer 92 input to rotate drive rotors 32*a*, 32*b*, 32*c* and 32*d* and driven axes 35*a*, 35*b*, 35*c* and 35*d*, respectively, about central axis 20 relative to main rotor shaft 18 and blade 22 in a rotational direction that is the same as the rotational direction of main rotor 17 and hubs 25 and 22 and at a desired operational frequency or speed of rotation relative to the operational frequency or speed of rotation of main rotor 17 about central axis 20 to individually control pitch angles 71*a*, 71*b*, 71*c* and 71*d* of rotor blades 19*a*, 19*b*, 19*c* and 19*d*, respectively, independently of each other, as explained above.

While the presently preferred form of the rotor blade pitch control system has been shown and described, and several modifications thereof discussed, persons skilled in this art will readily appreciate that various additional changes and modifications may be made without departing from the scope of the invention, as defined and differentiated by the claims.

What is claimed is:

1. A rotor blade pitch control system for a rotary-wing aircraft having a plurality of rotor blades mounted to a main rotor and driven about a central axis of rotation at an operational speed and in a rotational direction relative to a non-rotating body of the aircraft comprising:

a first rotor blade connected to a main rotor and operatively configured to be driven about a central axis of rotation relative to a non-rotating body of the aircraft;

said first rotor blade rotatable about a first pitch axis;

a first blade pitch control motor having a first stator, a first pitch drive rotor and a first pitch follower;

a first linkage extending between said first pitch follower and said first rotor blade;

a first rotor blade coupling between said first linkage and said first rotor blade;

said first rotor blade coupling having a first rotor blade coupling center;

a first pitch follower coupling between said first linkage and said first pitch follower;

said first pitch follower coupling having a first pitch follower coupling center;

a first hinge coupling between said first linkage and said main rotor;

said first hinge coupling having a first hinge axis;

said first pitch drive rotor having a first cam surface orientated about a first driven axis that is eccentric to said central axis of rotation;

said first linkage extending between said main rotor and said first pitch follower such that said first pitch follower coupling center rotates about said central axis of rotation with rotation of said first hinge coupling about said central axis of rotation;

said first pitch drive rotor operatively configured to be driven about said central axis of rotation independently of said main rotor to selectively rotate said first driven axis about said central axis of rotation;

said first driven axis and said first pitch follower coupling center having a selectively variable first displacement angle defined by an inclusive angle between a line extending radially between said central axis of rotation and said first driven axis and a line extending radially between said central axis of rotation and said first pitch follower coupling center; and wherein said first pitch drive rotor may be rotated about said central axis of rotation relative to said main rotor to control a pitch of said first rotor blade about said first pitch axis.

2. The rotor blade pitch control system set forth in claim 1, wherein said first pitch follower coupling comprises a ball joint or a universal coupling.

3. The rotor blade pitch control system set forth in claim 1, wherein said first pitch drive rotor radially constrains said first pitch follower relative to said central axis of rotation.

4. The rotor blade pitch control system set forth in claim 1, comprising:

a unit frame mounted to a non-rotating body of the aircraft;

said first stator of said first blade pitch control motor mounted to said unit frame; and said first pitch drive rotor having an annular stator-facing portion and a plurality of magnets supported by said annular stator-facing portion.

5. The rotor blade pitch control system set forth in claim 1, wherein said first displacement angle ranges from a minimum displacement angle to a maximum displacement angle, said pitch ranges from a first pitch angle limit to a second pitch angle limit, and when said first displacement angle is 180 degrees, said pitch is said first pitch angle limit, and when said first displacement angle is 0 degrees, said pitch is said second pitch angle limit.

6. The rotor blade pitch control system set forth in claim 5, wherein said pitch comprises a neutral pitch angle, and when said first displacement angle is 90 degrees, said pitch is said neutral pitch angle.

7. The rotor blade pitch control system set forth in claim 1, comprising:

a second rotor blade connected to said main rotor and operatively configured to be driven about said central axis of rotation relative to said non-rotating body of the aircraft;

said second rotor blade rotatable about a second pitch axis;

a second blade pitch control motor having a second stator, a second pitch drive rotor and a second pitch follower;

a second linkage extending between said second pitch follower and said second rotor blade;

a second rotor blade coupling between said second linkage and said second rotor blade;

said second rotor blade coupling having a second rotor blade coupling center;

a second pitch follower coupling between said second linkage and said second pitch follower;

said second pitch follower coupling having a second pitch follower coupling center;

a second hinge coupling between said second linkage and said main rotor;

said second hinge coupling having a second hinge axis;

said second pitch drive rotor having a second cam surface orientated about a second driven axis that is eccentric to said central axis of rotation;

said second linkage extending between said main rotor and said second pitch follower such that said second pitch follower coupling center rotates about said central axis of rotation with rotation of said second hinge coupling about said central axis of rotation;

said second pitch drive rotor operatively configured to be driven about said central axis of rotation independently of said main rotor and independently of said first pitch drive rotor to selectively rotate said second driven axis about said central axis of rotation; and said second driven axis and said second pitch follower coupling center having a selectively variable second displacement angle defined by an inclusive angle between a line extending between said central axis of rotation and said second driven axis and a line extending between said central axis of rotation and said second pitch follower coupling center;

wherein said second pitch drive rotor may be rotated about said central axis of rotation relative to said main rotor to control a pitch of said second rotor blade about said second pitch axis independently of said control of said pitch of said first rotor blade about said first pitch axis.

8. The rotor blade pitch control system set forth in claim 7, comprising a controller that receives input signals and outputs command signals to said second blade pitch control motor to control a speed of rotation of said second pitch drive rotor about said central axis of rotation relative to said main rotor to control a pitch and said second displacement angle.

9. The rotor blade pitch control system set forth in claim 1, wherein:
said first linkage comprises a first transfer link and a first pitch link;
said main rotor comprises a hinge hub; and
said first rotor blade comprises a pitch horn.

10. The rotor blade pitch control system set forth in claim 9, wherein:
said first transfer link is coupled to said first pitch follower by said first pitch follower coupling;
said first transfer link is coupled to said hinge hub of said main rotor by said first hinge coupling;
said first pitch link is coupled to said first pitch horn of said first rotor blade by said first rotor blade coupling; and
said first transfer link is coupled to said first pitch link by a first intermediate coupling having a first intermediate coupling center.

11. The rotor blade pitch control system set forth in claim 9, wherein said first rotor blade coupling center of said first rotor blade coupling is offset a pitch horn distance from said first pitch axis.

12. The rotor blade pitch control system set forth in claim 1, wherein said first pitch follower is rotatable relative to said first pitch drive rotor about said first driven axis.

13. The rotor blade pitch control system set forth in claim 12, wherein:
said first pitch drive rotor comprises a first annular drive bore having a first drive axis coincident with said central axis of rotation;
said first cam surface of said first pitch drive rotor comprises a first outer annular rim having a first rim axis coincident with said first driven axis; and
said first pitch follower comprises a first annular following bore having a first following bore axis coincident with said first rim axis.

14. The rotor blade pitch control system set forth in claim 13, comprising an annular bearing between said first outer annular rim and said first annular following bore.

15. The rotor blade pitch control system set forth in claim 1, comprising a controller that receives input signals and outputs command signals to said first blade pitch control motor to control a speed of rotation of said first pitch drive rotor about said central axis of rotation and said first displacement angle.

16. The rotor blade pitch control system set forth in claim 15, wherein said controller varies said first displacement angle to vary said pitch of said first rotor blade about said first pitch axis.

17. The rotor blade pitch control system set forth in claim 16, wherein said first displacement angle is variable from 0 degrees to 180 degrees.

18. The rotor blade pitch control system set forth in claim 16, wherein said controller maintains a constant first displacement angle to maintain a desired constant pitch of said first rotor blade about said first pitch axis.

19. The rotor blade pitch control system set forth in claim 16, wherein said controller varies said pitch of said first rotor blade about said first pitch axis by varying said speed differential such that said first rotational speed that said first driven axis rotates about said central axis of rotation is different from said second rotational speed that said main rotor rotates about said central axis of rotation.

20. The rotor blade pitch control system set forth in claim 16, wherein said controller selectively controls said first blade pitch control motor such that said first driven axis rotates about said central axis of rotation at a first rotational speed and said main rotor rotates about said central axis of rotation at a second rotational speed, whereby said controller controls a speed differential between said first speed of rotation of said first driven axis about said central axis of rotation and said second speed of rotation of said main rotor about said central axis of rotation.

21. The rotor blade pitch control system set forth in claim 20, wherein said controller varies said first displacement angle by varying said speed differential from substantially 1 to 1.

22. A rotor blade pitch control system comprising:
a first rotor blade operatively configured to be driven about a central axis of rotation;
said first rotor blade rotatable about a first pitch axis;
a first pitch drive rotor operatively configured to be driven about said central axis of rotation independently of rotation of said first rotor blade about said central axis of rotation;
a first pitch follower rotatable relative to said first pitch drive rotor;
said first pitch follower and said first rotor blade coupled such that said first pitch follower rotates with rotation of said first rotor blade about said central axis of rotation;
said first pitch drive rotor, said first pitch follower and said first rotor blade coupled such that said first pitch drive rotor is operatively configured to be driven to control an angular displacement of said first pitch drive rotor relative to said first pitch follower about said central axis of rotation and thereby control a pitch of said first rotor blade about said first pitch axis.

23. The rotor blade pitch control system set forth in claim 22, comprising:
a second rotor blade operatively configured to be driven about said central axis of rotation;
said second rotor blade rotatable about a second pitch axis;
a second pitch drive rotor operatively configured to be driven about said central axis of rotation independently of rotation of said second rotor blade about said central axis of rotation and independently of said first pitch drive rotor about said central axis of rotation;
a second pitch follower rotatable relative to said second pitch drive rotor;

said second pitch follower and said second rotor blade coupled such that said second pitch follower rotates with rotation of said second rotor blade about said central axis of rotation;

said second pitch drive rotor, said second pitch follower and said second rotor blade coupled such that said second pitch drive rotor is operatively configured to be driven to control an angular displacement of said second pitch drive rotor relative to said second pitch follower about said central axis of rotation and thereby control a pitch of said second rotor blade about said second pitch axis independently of said control of said pitch of said first rotor blade about said first pitch axis.

24. The rotor blade pitch control system set forth in claim 22, comprising a first blade pitch control motor operatively configured to drive said first pitch drive rotor about said central axis of rotation and a controller that receives input signals and outputs command signals to said first blade pitch control motor to control a speed of rotation of said first pitch drive rotor about said central axis of rotation and said angular displacement of said first pitch drive rotor relative to said first pitch follower about said central axis of rotation.

25. The rotor blade pitch control system set forth in claim 22, comprising a first linkage between said first pitch follower and said first rotor blade.

26. The rotor blade pitch control system set forth in claim 25, comprising:
a first pitch follower coupling between said first linkage and said first pitch follower;
said first pitch follower coupling having a first pitch follower coupling center;
said first pitch drive rotor having a first cam surface orientated about a first driven axis that is eccentric to said central axis of rotation; and
wherein said angular displacement of said first pitch drive rotor relative to said first pitch follower comprises a selectively variable first displacement angle defined by an inclusive angle between a line extending radially between said central axis of rotation and said first driven axis and a line extending radially between said central axis of rotation and said first pitch follower coupling center.

27. The rotor blade pitch control system set forth in claim 26, comprising:
a main rotor connected to said first rotor blade and operatively configured to be driven about said central axis of rotation;
a first hinge coupling between said first linkage and said main rotor;
said first hinge coupling having a first hinge axis; and
said first linkage extending between said main rotor and said first pitch follower such that said first pitch follower coupling center rotates about said central axis of rotation with rotation of said first hinge coupling about said central axis of rotation.

* * * * *